US012592156B2

(12) United States Patent
Brockers et al.

(10) Patent No.: US 12,592,156 B2
(45) Date of Patent: Mar. 31, 2026

(54) METHOD AND SYSTEM FOR ON-BOARD LOCALIZATION

(71) Applicant: California Institute of Technology, Pasadena, CA (US)

(72) Inventors: Roland Brockers, Pasadena, CA (US); Friedrich Alexander Dietsche, Herrliberg (CH); Jeff Hugues Luc Delaune, Pasadena, CA (US); Pedro Proença, Pasadena, CA (US); Robert Alexander Hewitt, Tujunga, CA (US); Georgios Georgakis, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 201 days.

(21) Appl. No.: 18/312,444

(22) Filed: May 4, 2023

(65) Prior Publication Data

US 2023/0360547 A1    Nov. 9, 2023

Related U.S. Application Data

(60) Provisional application No. 63/441,020, filed on Jan. 25, 2023, provisional application No. 63/338,381, filed on May 4, 2022.

(51) Int. Cl.
G08G 5/00 (2025.01)
G06V 20/17 (2022.01)
(Continued)

(52) U.S. Cl.
CPC .............. G08G 5/55 (2025.01); G06V 20/17 (2022.01); G08G 5/57 (2025.01)

(58) Field of Classification Search
CPC ............ G08G 5/55; G08G 5/57; G06V 20/17; G06V 10/462; G06V 10/82
See application file for complete search history.

(56) References Cited

U.S. PATENT DOCUMENTS

| 5,146,228 | A | * | 9/1992 | Irani | .................... | G01C 21/005 |
| | | | | | | 342/64 |
| 6,853,332 | B1 | * | 2/2005 | Brookes | ................. | G06T 17/05 |
| | | | | | | 342/63 |

(Continued)

FOREIGN PATENT DOCUMENTS

| EP | 2829940 A2 | * | 1/2015 | ............. | G06V 20/13 |
| WO | WO-2024074595 A1 | * | 4/2024 | ............. | B64U 10/13 |

OTHER PUBLICATIONS

Couturier, A. et al. "A review on absolute visual localization for UAV". Robotics and Autonomous Systems, 2021, pp. 1-17, 103666, vol. 135 [online], [retrieved on Apr. 18, 2025]. Retrieved from the Internet <URL: https://www.sciencedirect.com/science/article/pii/S0921889020305066?via%3Dihub> (Year: 2021).*

(Continued)

*Primary Examiner* — Peter D Nolan
*Assistant Examiner* — Peter Y Ning
(74) *Attorney, Agent, or Firm* — Gates & Cooper LLP

(57) ABSTRACT

A method and system provide for on-board localization in a unmanned aerial system (UAS). A map image is generated (using previously acquired images) of an area that the UAS is overflying. The map image is then processed by orthorectifying, referencing the map image in a global reference frame, and generating an abstract map by detecting features and locating the features in the global reference frame. The UAS is then localized by acquiring camera images during flight, selecting a subset of the camera images as localization images, detecting on-board image features (in the localization images), mapping features from the detected on-board
(Continued)

image features to the abstract map, deleting outliers to determine an estimated 3D pose, and refining the 3D pose. The localized UAS then used to autonomously navigate the UAS.

29 Claims, 21 Drawing Sheets

(51) Int. Cl.
  G08G 5/55         (2025.01)
  G08G 5/57         (2025.01)

(56)                References Cited

U.S. PATENT DOCUMENTS

| | | | | |
|---|---|---|---|---|
| 10,037,028 | B2 * | 7/2018 | Loianno | G08G 5/32 |
| 10,515,458 | B1 * | 12/2019 | Yakimenko | G06T 7/33 |
| 11,107,275 | B2 * | 8/2021 | Millin | G08G 5/74 |
| 11,244,500 | B2 * | 2/2022 | Marschner | G01S 17/89 |
| 11,808,578 | B2 * | 11/2023 | Wissler | G06V 20/13 |
| 2009/0210092 | A1 * | 8/2009 | Park | G05D 1/0274 |
| | | | | 901/1 |
| 2009/0285450 | A1 * | 11/2009 | Kaiser | G01C 21/1656 |
| | | | | 348/169 |
| 2016/0195878 | A1 * | 7/2016 | Peleg | F41G 7/2293 |
| | | | | 244/3.11 |
| 2017/0084037 | A1 * | 3/2017 | Barajas Hernandez | |
| | | | | G06V 10/462 |
| 2019/0089602 | A1 * | 3/2019 | Bagade | H04L 41/082 |
| 2020/0202143 | A1 * | 6/2020 | Viswanathan | G06V 20/588 |
| 2020/0240790 | A1 * | 7/2020 | Behrendt | G01S 13/865 |
| 2020/0334857 | A1 * | 10/2020 | Garud | G06V 20/647 |
| 2021/0318140 | A1 * | 10/2021 | Tang | G01C 21/3896 |
| 2021/0366148 | A1 * | 11/2021 | Gliner | G06T 7/73 |
| 2022/0164595 | A1 * | 5/2022 | Zhou | G06V 10/757 |
| 2022/0180476 | A1 * | 6/2022 | Poddar | G06T 3/4046 |
| 2022/0196432 | A1 * | 6/2022 | Buda | G01C 21/3841 |
| 2023/0112417 | A1 * | 4/2023 | Schildwaechter | G01C 21/30 |
| | | | | 701/25 |
| 2024/0257387 | A1 * | 8/2024 | Peterfreund | G06V 10/766 |

OTHER PUBLICATIONS

Vaswani, A., et al., "Attention Is All You Need", 31st Conference on Neural Information Processing Systems (NIPS 2017), pp. 1-11.
Alcantarilla, P.F., et al., "Fast Explicit Diffusion for Accelerated Features in Nonlinear Scale Spaces", IEEE Transactions on Pattern Analysis and Machine Intelligence, 2013, pp. 1281-1298, vol. 34, No. 7.
Sivic, J., et al., "Video Google: A Text Retrieval Approach to Object Matching in Videos", Proceedings of the IEEE International Conference on Computer Vision, 2003, pp. 1470-1477, vol. 2.
Baeza-Yates, R., et al., "Modern Information Retrieval", ACM Press, 1999, pp. 1-38, vol. 463.
Bapst, J., et al., "Mars Science Helicopter—Compelling Science Enabled by an Aerial Platform", National Aeronautics and Space Administration, Planetary Science and Astrobiology Decadal Survey 2023-2032, 2021, pp. 1-8.
Rapin, W, et al., "Critical knowledge gaps in the Martian geological record: A rationale for regional-scale in situ exploration by rotorcraft mid-air deployment", Planetary Science and Astrobiology Decadal Survey 20232032, 2021, pp. 1-8.
Couturier, A., et al., "A review on absolute visual localization for UAV", Robotics and Autonomous Systems, 2021, pp. 1-17, 103666, vol. 135.
Delaune, J., et al., "Visual-inertial navigation for pinpoint planetary landing using scale-based landmark matching", Robotics and Autonomous Systems, 2016, pp. 63-82, vol. 78.
Conte, G., et al., "Vision-Based Unmanned Aerial Vehicle Navigation Using Geo-Referenced Information", EURASIP Journal on Advances in Signal Processing, 2009, pp. 1-18.

Yol, A., et al., "Vision-based Absolute Localization for Unmanned Aerial Vehicles", IEEE/RSJ Int. Conf. on Intelligent Robots and Systems, IROS'14, Sep. 2014, pp. 1-6.
Mourikis, A.I., et al., "A Multi-State Constraint Kalman Filter for Vision-aided Inertial Navigation", Proceedings of the IEEE International Conference on Robotics and Automation, 2007, pp. 3565-3572.
Matthies, L., et al., "Terrain Relative Navigation for Guided Descent on Titan", 2020 IEEE Aerospace Conference, 2020, pp. 1-16.
Mourikis, A.I., et al., "Vision-Aided Inertial Navigation for Spacecraft Entry, Descent, and Landing", IEEE Transactions On Robotics, Apr. 2009, pp. 264-280, vol. 25, No. 2.
Lowe, D., "Distinctive Image Features from Scale-Invariant Keypoints", International Journal of Computer Vision, 2004, pp. 91-110, vol. 60.
Pham, B.V., et al., "Vision-Based Absolute Navigation for Descent and Landing", Journal of Field Robotics, 2012, pp. 627-647, vol. 29, No. 4.
Cheng, Y., et al., "Landmark Based Position Estimation for Pinpoint Landing on Mars", Proceedings of the 2005 IEEE International Conference on Robotics and Automation, 2005, pp. 1-6.
Dusmanu, M., et al., "D2-Net: A Trainable CNN for Joint Description and Detection of Local Features", Proceedings of the IEEE/CVF Conference on Computer Vision and Pattern Recognition (CVPR), 2019, pp. 8092-8101.
Detone, D., et al., "SuperPoint: Self-Supervised Interest Point Detection and Description", CVPR 2018 Deep Learning for Visual SLAM Workshop, 2018, pp. 1-13.
Jin, Y., et al., "Image Matching Across Wide Baselines: From Paper to Practice", International Journal of Computer Vision, 2021, pp. 517-547, vol. 129.
Delaune, J., et al., "Extended Navigation Capabilities for a Future Mars Science Helicopter Concept", IEEE Aerospace Conference, 2020, pp. 1-10.
Delaune, J., et al., "Range-Visual-Inertial Odometry: Scale Observability Without Excitation", IEEE Robotics and Automation Letters, Apr. 2021, pp. 2421-2428, vol. 6, No. 2.
Shah, S., et al., "AirSim: High-Fidelity Visual and Physical Simulation for Autonomous Vehicles", Field and Service Robotics, 2017, pp. 621-635.
Bay, H., et al., "SURF: Speeded Up Robust Features", European Conference on Computer Vision, 2006, LNCS 3951, pp. 404-417.
Rublee, E., et al., "ORB: an efficient alternative to SIFT or SURF", International Conference on Computer Vision, 2011, pp. 1-8.
Mikolajczyk, K., et al., "Scale & Affine Invariant Interest Point Detectors", International Journal of Computer Vision, 2004, pp. 63-86, vol. 60, No. 1.
Brockers, R., et al., "Autonomous Safe Landing Site Detection for a Future Mars Science Helicopter", IEEE Aerospace Conference, Mar. 2021, pp. 1-8.
Delaune, J., et al., "xVIO: A Range-Visual-Inertial Odometry Framework", Jet Propulsion Laboratory, California Institute of Technology, 2020, pp. 1-67.
Brockers, R., et al., "On-board Absolute Localization Based on Orbital Imagery for a Future Mars Science Helicopter", IEEE Aerospace Conference, Mar. 2022, pp. 1-11.
Clemente, L.A., et al., "Mapping Large Loops with a Single Hand-Held Camera", Robotics: Science and Systems, 2007, pp. 1-8.
Williams, B., et al., "Real-Time SLAM Relocalisation", Proceedings of the IEEE International Conference on Computer Vision, 2007, pp. 1-8.
Nister, D., et al., "Scalable Recognition with a Vocabulary Tree", Proceedings of the IEEE Computer Society Conference on Computer Vision and Pattern Recognition, 2006, pp. 2161-2168, vol. 2.
Jegou, H., et al., "Hamming Embedding and Weak Geometric Consistency for Large Scale Image Search", European Conference on Computer Vision, 2008, pp. 304-317, vol. 5302.
Philbin, J., et al., "Lost in Quantization: Improving Particular Object Retrieval in Large Scale Image Databases", Proceeding of the IEEE Conference on Computer Vision and Pattern Recognition, 2008, pp. 1-8.
Cummins, M., et al., "FAB-MAP: Probabilistic Localization and Mapping in the Space of Appearance", The International Journal of Robotics Research, Jun. 2008, pp. 647-665, vol. 27, No. 6.

(56)         References Cited

OTHER PUBLICATIONS

Calonder, M., et al., "BRIEF: Binary Robust Independent Elementary Features", European Conference on Computer Vision, 2010, pp. 778-792, vol. 6314.

Galvez-Lopez, D., et al., "Bags of Binary Words for Fast Place Recognition in Image Sequences", IEEE Transactions on Robotics, 2012, pp. 1188-1197, vol. 28, No. 5.

Mur-Artal, R., et al., "ORB-SLAM: A Versatile and Accurate Monocular SLAM System", IEEE Transactions On Robotics, Oct. 2015, pp. 1147-1163, vol. 31, No. 5.

Mur-Artal, R., et al., "ORB-SLAM2: An Open-Source SLAM System for Monocular, Stereo, and RGB-D Cameras", IEEE Transactions On Robotics, Oct. 2017, pp. 1255-1262, vol. 33, No. 5.

Campos, C., et a., "ORB-SLAM3: An Accurate Open-Source Library for Visual, Visual-Inertial, and Multimap SLAM", IEEE Transactions On Robotics, Dec. 2021, pp. 1874-1890, vol. 37, No. 6.

Qin, T., et al., "VINS-Mono: A Robust and Versatile Monocular Visual-Inertial State Estimator", IEEE Transactions On Robotics, Aug. 2018, pp. 1004-1020, vol. 34, No. 4.

Sumikura, S., et al., "OpenVSLAM: A Versatile Visual SLAM Framework", MM 2019—Proceedings of the 27th ACM International Conference on Multimedia, 2019, pp. 2292-2295.

Schops, T., et al., "BAD SLAM: Bundle Adjusted Direct RGB-D SLAM", Proceedings of the IEEE Computer Society Conference on Computer Vision and Pattern Recognition, Jun. 2019, pp. 134-144.

Giubilato, R., et al., "Multi-Modal Loop Closing in Unstructured Planetary Environments with Visually Enriched Submaps", 2021 IEEE/RSJ International Conference on Intelligent Robots and Systems (IROS), 2021, pp. 8758-8765.

Arandjelovic, R., et al., "NetVLAD: CNN architecture for weakly supervised place recognition", IEEE Transactions on Pattern Analysis and Machine Intelligence, 2018, pp. 1437-1451, vol. 40, No. 6.

Naseer, T., et al., "Semantics-aware Visual Localization under Challenging Perceptual Conditions", 2017 IEEE International Conference on Robotics and Automation (ICRA), 2017, pp. 2614-2620.

Latif, Y., et al., "Addressing Challenging Place Recognition Tasks using Generative Adversarial Networks", 2018 IEEE International Conference on Robotics and Automation (ICRA), 2018, pp. 2349-2355.

Nister, D., "An Efficient Solution to the Five-Point Relative Pose Problem", IEEE Transactions On Pattern Analysis and Machine Intelligence, Jun. 2004, pp. 756-770, vol. 26, No. 6.

Muja, M., et al., "Fast Approximate Nearest Neighbors With Automatic Algorithm Configuration", Proceedings of the 4th International Conference on Computer Vision Theory and Applications, 2009, pp. 331-340, vol. 2, No. 2.

Mur-Artal, R., et al., "Fast Relocalisation and Loop Closing in Keyframe-Based SLAM", Proceedings of the IEEE International Conference on Robotics and Automation, 2014, pp. 846-853.

Bay, H., et al., "Speeded-Up Robust Features (SURF)", Computer Vision and Image Understanding, 2008, pp. 346-359, vol. 110, No. 3.

Alahi, A., et al., "FREAK: Fast Retina Keypoint", Proceedings of the IEEE Computer Society Conference on Computer Vision and Pattern Recognition, 2012, pp. 510-517.

Leutenegger, S., et al., "BRISK: Binary Robust Invariant Scalable Keypoints", Proceedings of the IEEE International Conference on Computer Vision, 2011, pp. 2548-2555.

Alcantarilla, "Fast Explicit Diffusion for Accelerated Features in Nonlinear Scale Spaces", IEEE Transactions on Pattern Analysis and Machine Intelligence, 2013, pp. 1281-1298, vol. 34, No. 7.

Lin, T-Y, et al., "Feature Pyramid Networks for Object Detection", CVPR 2017, pp. 1-9.

* cited by examiner

Generate Map Image — 1802

Process Map Image — 1804

Localize the UAS — 1806

Utilize Localized UAS to Navigate/
Control the UAS — 1808

METHOD AND SYSTEM FOR ON-BOARD LOCALIZATION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 63/441,020, filed on Jan. 25, 2023, with inventor(s) Roland Brockers, Jeff H. Delaune, and Pedro Duarte Lopes Mascarenhas Proenca, entitled "Vision-Based Absolute Localization for Unmanned Aerial Systems Based on Orbital or Aerial Image Maps,"; and Provisional Application Ser. No. 63/338,381, filed on May 4, 2022, with inventor(s) Roland Brockers and Alexander Dietsche, entitled "Detecting Previously Visited Locations on Autonomous Aerial Vehicles."

This application is related to the following co-pending and commonly-assigned patent application, which application is incorporated by reference herein:

U.S. patent application Ser. No. 16/667,655, filed on Oct. 29, 2019, with inventor(s) Roland Brockers, Stephan Michael Weiss, Danylo Malyuta, Christian Brommer, and Daniel Robert Hentzen, entitled "Long-Duration, Fully Autonomous Operation of Rotorcraft Unmanned Aerial Systems Including Energy Replenishment", which application claims the benefit of Provisional Application Ser. No. 62/752,199, filed on Oct. 29, 2018, with inventor(s) Roland Brockers, Darren T. Drewry, Danylo Malyuta, Christian Brommer, and Daniel Hentzen, entitled "Long-Duration, Fully Autonomous Operation of Small Rotorcraft Unmanned Aerial Systems Including Recharging," which application is incorporated by reference herein; and U.S. patent application Ser. No. 17/740,101, filed on May 9, 2022, with inventor(s) Roland Brockers, Pedro Duarte Lopes Mascarenhas Proença, Pascal Schoppmann, Matthias Domnik, and Jeff H. Delaune, entitled "Unmanned Aerial System (UAS) Autonomous Terrain Mapping and Landing Site Detection", which application claims the benefit of: Provisional Application Ser. No. 63/185,601, filed on May 7, 2021, with inventor(s) Pedro Duarte Lopes Mascarenhas Proena, Roland Brockers, Jeff H. Delaune, Pascal Schoppmann, and Matthias Domnik, entitled "UAV Landing Site Detection Bb Optimal Mixture of Gaussian Elevation Map Fusion and Heuristic Landing Site Selection," and Provisional Application Ser. No. 63/338,754, filed on May 5, 2022 with inventor(s) Pedro Duarte Lopes Mascarenhas Proenca, Roland Brockers, Jeff H. Delaune, Pascal Schoppmann, and Matthias Domnik, entitled "UAV Landing Site Detection By Optimal Mixture of Gaussian Elevation Map Fusion and Heuristic Landing Site Selection," which applications are incorporated by reference herein.

STATEMENT REGARDING FEDERALLY SPONSORED RESEARCH AND DEVELOPMENT

This invention was made with government support under Grant No. 80NM0018D0004 awarded by NASA (JPL). The government has certain rights in the invention.

BACKGROUND OF THE INVENTION

1. Field of the Invention

The present invention relates generally to autonomous flight navigation, and in particular, to a method, system, vehicle, apparatus, and article of manufacture for advanced navigation capabilities that enable all terrain access over long distance flights that are executed fully autonomously.

2. Description of the Related Art (Note: This application references a number of different publications as indicated throughout the specification by names enclosed in brackets, e.g., [Smith]. A list of these different publications ordered according to these reference names can be found below in the section entitled "References." Each of these publications is incorporated by reference herein.)

With the success of NASA's Mars Helicopter Ingenuity new mission concepts become feasible, including a stand-alone Mars Science Helicopter (MSH) concept with the capability to carry multi-kg instrument payloads and traverse more than 10 km per flight over high-relief landscapes, such as steep slopes, cliffs, and other three-dimensional (3D) terrain [Bapst], [Rapin].

To enable fully autonomous flights in such challenging environments, an on-board navigation system is required, that reliably estimates vehicle pose over any type of terrain, but also has the ability to reference this pose in a global frame. This is critical to enable precision navigation and eliminate state estimator drift during flight.

On Earth, the vast majority of Unmanned Aircraft Systems (UAS) use the Global Positioning System (GPS) to establish a global reference, but since such a system does not exist on Mars, on-board data has to be registered to existing data within the global frame such as orbital image products (e.g. from HiRISE [High Resolution Imaging Science Experiment] or CTX [Context Camera]).

Embodiments of the invention provide a vision-based localization method to provide a Mars rotorcraft with a global reference during flight. Embodiments may use a feature-based registration process to establish a correspondence between individual images from an on-board navigation camera and a geo-referenced ortho-image and digital elevation map (DEM) to calculate vehicle pose in the global frame. To better understand the problems of the prior art, it may be useful to have an overview of the state of the art in map-based localization.

The following description reviews existing research work addressing the problem of matching a query image against a map image. The query image is assumed to have been captured by a camera mounted on the robot one wishes to localize (e.g., MSH in an exemplary application). The map image is assumed to have been captured at a different time, potentially by a different camera (e.g., HiRISE). Both the query and map images are assumed to be in the visible spectrum, and to overlap over a portion of terrain with enough texture and enough illumination to provide the information for a unique match. The objective of this research area is to identify image descriptors invariant to the potentially-severe transformation between the query and the map: scale, viewpoint, illumination or even change in the terrain itself.

2D-2D image matching represents only one branch of map-based localization. Similarly, 3D-3D can be used to match a 3D query model of the terrain acquired or reconstructed by on-board sensors, with a map prior. 3D-3D matching cannot operate over flat terrain, while 2D-2D can operate over all types of terrain. [Couturier] provides an extensive review of the approaches for 2D-2D visual matching from a drone published after 2015. [Delaune 1] reviews the methods for image matching techniques proposed for planetary entry, descent and landing before 2016. Embodiments of the invention may be situated at the intersection of drone and planetary exploration. The description below reviews the main existing approaches relevant to the MSH map-based localization problem, and discusses their advantages and limitations.

Full-Image Alignment

The most straightforward visual matching approach is to directly attempt to register the full query image onto the full map image. This is typically done by sweeping the query image over the map image and looking for the extremum of a score comparing the similarity of the two images. The score can be based on Normalized Cross-Correlation (NCC) [Conte], mutual information [Yol], or even in the frequency domain [Mourikis 1]. Because these methods do not discard any visual information, they are the most efficient on poorly-textured terrains where feature detection algorithms might struggle. They sometime even retain enough information to match across different parts of the spectrum [Matthies].

While full-image alignment is relatively computationally-efficient, the main drawback is the assumption of flat terrain over the whole field of view. Performance will strongly degrade in some of the highly-3D environments which are candidate targets for a MSH mission.

Photometric Feature Descriptors

The most popular image representation for vision-based pose estimation is to extract feature points, usually in areas of high contrast in the image. The visual information contained in a small patch (e.g., usually only over a few pixels) around a feature point is summarized in a data structure called a descriptor. Descriptors are usually associated to a mathematical distance, which can be used to compare the descriptors extracted in the query and the map images. A photometric descriptor can be as simple as a raw image patch, later matched by NCC [Mourikis 2]. The most widely used descriptor is the Scale-Invariant Feature Transform (SIFT) [Lowe]. It represents the orientation of image gradients in the neighborhood of a feature, at its characteristic scale.

Unlike full-image alignment, photometric descriptors only assume the terrain to be flat in the vicinity of a feature. They usually work on both 2D and 3D terrains. Descriptors like SIFT are robust to large scale or viewpoint changes. They have a lower processing cost than full-image alignment. However, they are only partially robust to illumination changes. When high-accuracy elevation and texture models of the terrain are available, full robustness to illumination could potentially be achieved by artificially rendering the map image in the query conditions.

Geometric Feature Descriptors

This particular type of descriptor does not directly use the photometric information around a feature, but rather the geometric distribution of its neighbors to describe it. This is similar to identifying a star based on the constellation it belongs to. In fact, [Pham] adapted star tracking algorithms to apply this technique to features on a flat terrain. [Delaune 1] proposed a technique for 3D terrains when a prior is available, adding a visual landmark scale in the descriptor. Finally, [Cheng] employed an invariant for a pair of conics to identify pairs of craters on planetary terrains.

Geometric descriptors offer the lowest computational cost and the best robustness to illumination changes on raw images. However, their performance depends strongly on landmark repeatability to maintain the geometric feature distribution between the query and the map image.

Learning-Based Approaches

Several learning-based feature descriptors have been proposed recently that use fully Convolutional Neural Networks to learn both interest point detection and feature descriptors [Dusmanu], [DeTone]. A fundamental advantage of such paradigm over local hand-crafted features is that the full image is used to learn feature descriptors providing richer contextual information. However, in practice learned descriptors are still not on par with SIFT (Scale Invariant Feature Transform) on certain tasks [Jin].

SUMMARY OF THE INVENTION

Embodiments of the invention overcome the problems of the prior art by providing advanced navigation capabilities that enable all terrain access over long distance flights that are executed fully autonomously. A critical component to enable precision navigation during long traverses is the ability to perform on-board absolute localization to eliminate drift in position estimates of the on-board odometry algorithm. Embodiments of the invention provide an approach for on-board map-based localization to provide a global reference position based on orbital or aerial image maps. Embodiments of the invention build on a vision-based localization method to localize against a map derived from HiRISE image products—an ortho-projected image (ortho-image) and a corresponding digital elevation map. The map is pre-computed using a feature-based approach. Features are stored with their 3D world coordinates, and a descriptor to code the local image intensity information in the vicinity of the feature location. An on-board matching algorithm uses this information to match visual features in a query image acquired during flight, guided by a pose prior from the on-board range-visual-inertial state estimator (Range-VIO). Valid matches are then used by a perspective-n-point (PnP) algorithm to estimate the absolute pose of the vehicle in a global frame. Embodiments of the invention further demonstrate and evaluate such an approach using simulated data as well as data from UAS (Unmanned Aircraft Systems) flights. In addition, learning based approaches may be used to improve the navigation/control of UAS.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

On-Board Absolute Localization

System Overview

Figure 1:
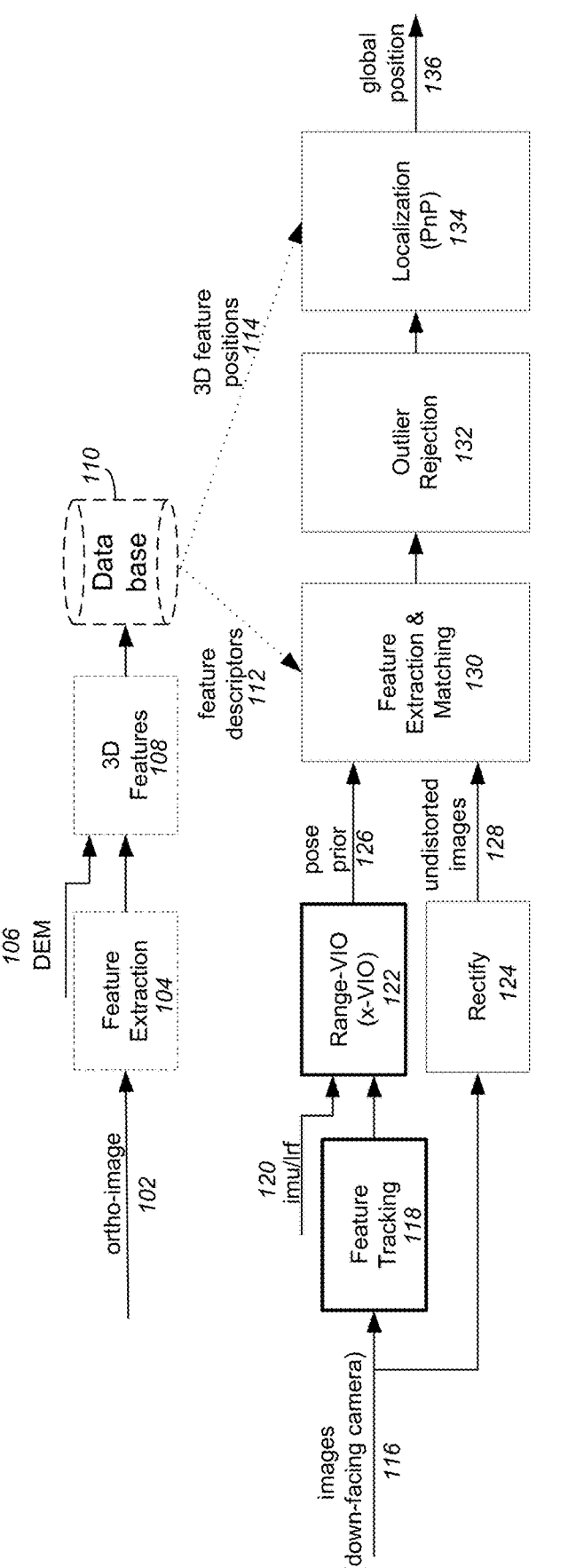
FIG. 1 illustrates a system overview of a map creation module and map matching module with leveraged state estimator functions in accordance with one or more embodiments of the invention.

Embodiments of the invention provide a map-based localization approach that follows a feature-based approach to match a query image against a map. This leads to two distinctive steps: Map Creation and Map Matching. FIG. 1 illustrates a system overview of a map creation module and map matching module with leveraged state estimator functions in accordance with one or more embodiments of the invention.

Map Creation 104-110: A map (e.g., 3D features 108) is created in a pre-processing step from an orthoimage 102 (where features are extracted 104) and a corresponding DEM (Digital Elevation Map) 106 and then stored in a map database 110, which consists of individual feature descriptors 112 and their corresponding 3D feature positions 114 in the world frame. This map data is then used in flight to match features detected in navigation images 116 (i.e., from the down-facing camera) to the features stored in the map database 110. The matching process (performed via matching module 124-134) is guided by a pose prior 126 from the on-board state estimator which consists of an estimated vehicle pose and covariance to capture pose uncertainty due to noise or drift. Matched features undergo an outlier rejection step 132, before localization 134 (e.g., a perspective-n-points (PnP) algorithm 134) estimates the 3D camera pose and thus vehicle global position 136 in the world frame using the feature 3D positions 114 stored within the map database 110.

The on-board state estimator is a separate navigation module, which leverages previously developed Range-Visual Inertial Odometry (Range-VIO) algorithm 122 to fuse observations from tracked visual features 118, an IMU/LRF 120—i.e., an IM [an inertial measurement unit] and a laser altimeter (down-facing laser range finder (LRF)) to estimate 6 degrees of freedom vehicle pose [Delaune 2], [Delaune 3].

Map Creation

Figure 2:
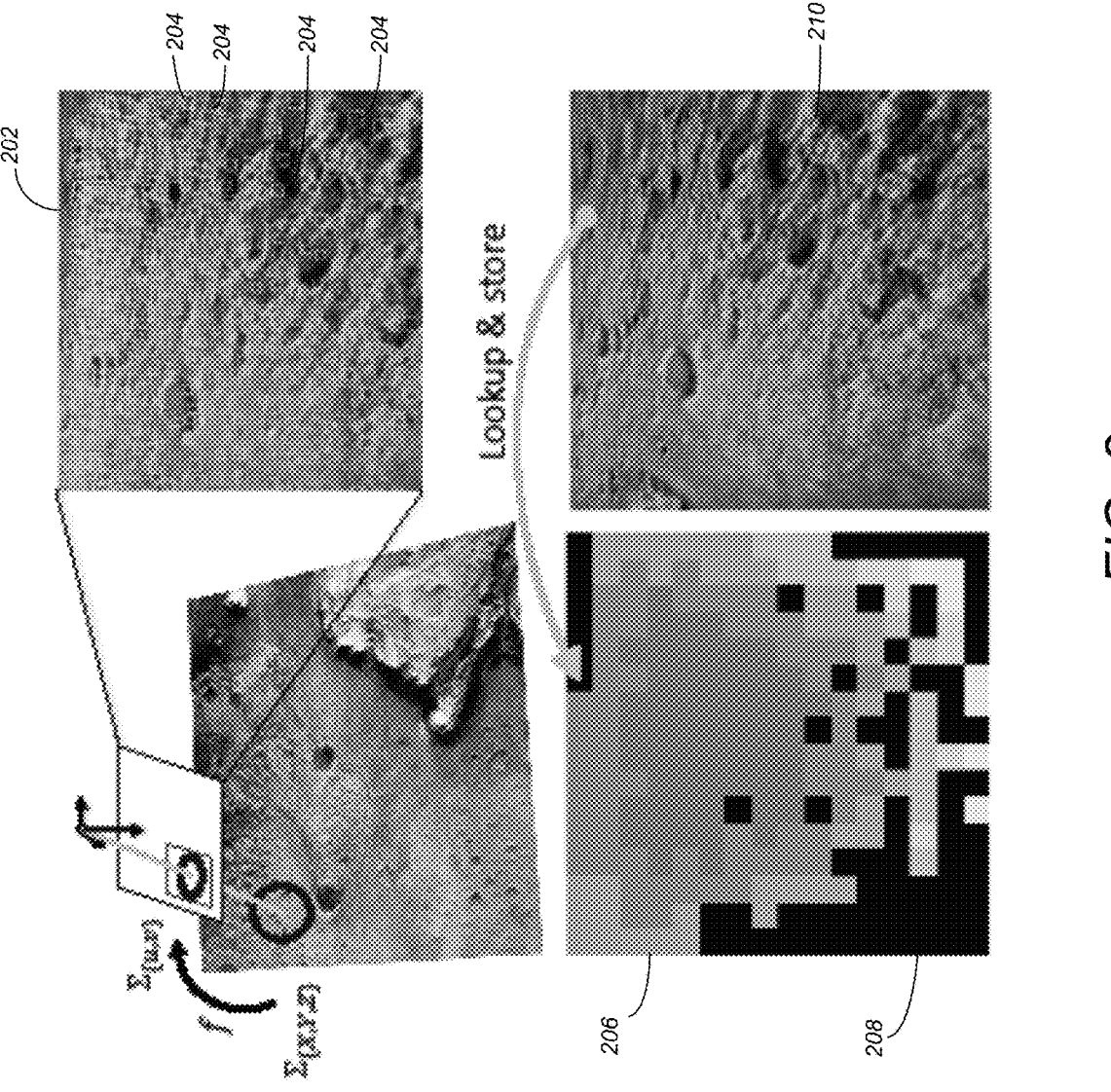
FIG. 2 illustrates matching using a pose prior in accordance with one or more embodiments of the invention.

To create the map database 110, embodiments of the invention first detect features (i.e., feature extraction 104) in the geo-referenced ortho-image 102. Since the ortho-image 102 can be fairly large, the ortho-image is divided into a set of tiles with an overlap area that is defined by the feature detector footprint. FIG. 2 illustrates matching using a pose prior in accordance with one or more embodiments of the invention. The algorithm generates search windows 202 for reprojected map keypoints 204 based on their uncertainty. The algorithm uses a coarse 2D lookup map 206 (i.e., based on a lookup and store from the terrain image 210) that stores the search window sizes to avoid computing uncertainty for all visible map keypoints. Bins may be color-coded or using different brightness/intensity with the search window size (brighter/warmer colors can correspond to larger windows/areas closer to the observer where black 208 reflects that no search window size was calculated for the area yet). As illustrated, search windows towards the bottom of 208 may be larger due to the smaller/closer distance to the terrain.

Smaller images are also currently required for feature extraction when using learned features such as Super-Point [DeTone] which embodiments of the invention may use in a performance comparison of different feature implementations (see below). Furthermore, smaller images may help overall to promote feature uniform distribution.

Figure 3:
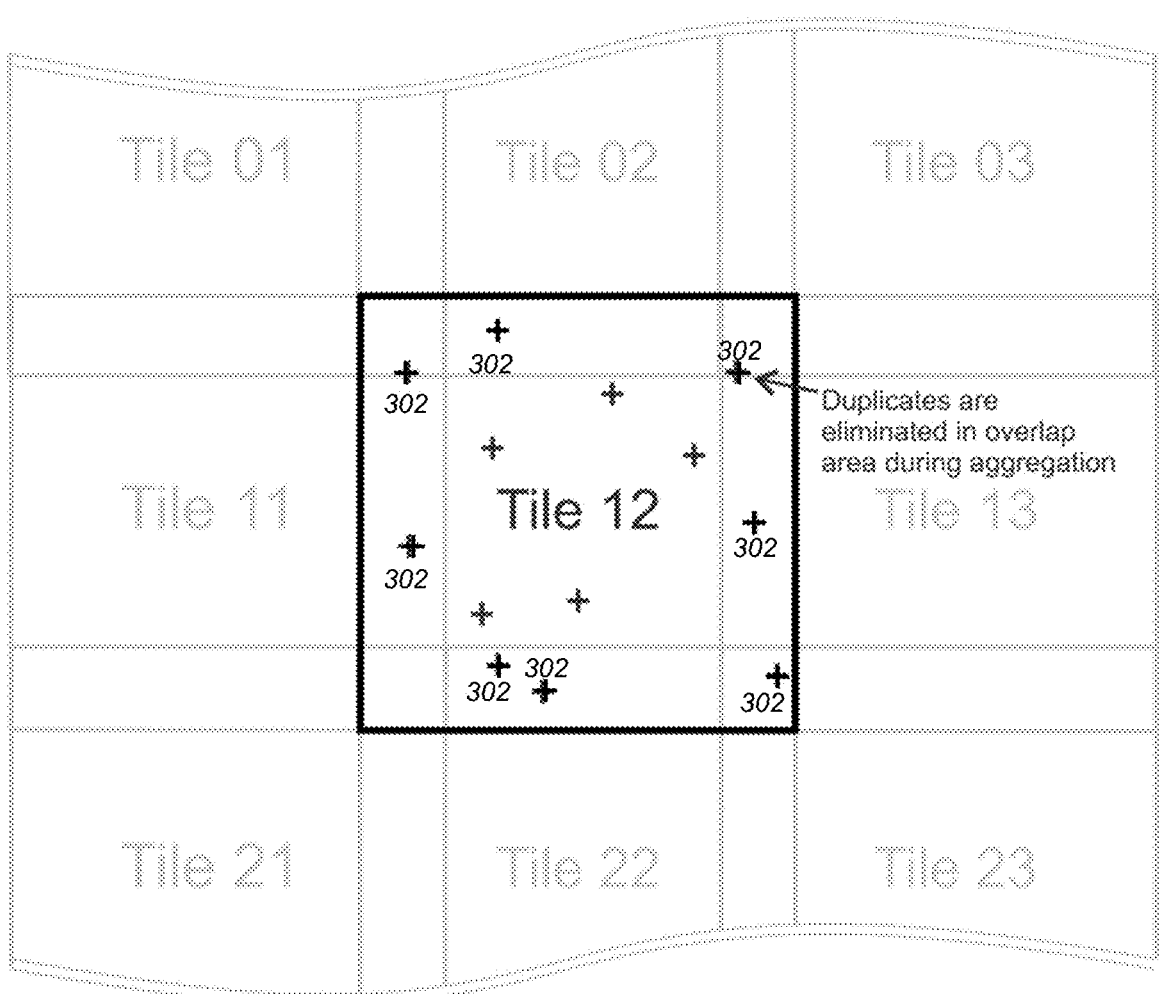
FIG. 3 illustrates an enlarged view of a tile in which duplicate features are eliminated in an overlap area during aggregation in accordance with one or more embodiments of the invention.

Features are extracted in image tiles independently with a desired number of features per tile. In a subsequent step, a finer grid may be used to reduce the number of features in highly dense feature clusters by only accepting a maximum number of features per grid cell. Surviving features are aggregated—removing duplicates in overlap areas—and stored in a map data base together with a feature descriptor to code the local image intensity information in the vicinity of the feature point, and the 3D world coordinates of the underlying terrain point (map keypoint) derived from the corresponding DEM. FIG. 3 illustrates an enlarged view of a tile (Tile 12) in which duplicate features 302 are eliminated in an overlap area during aggregation in accordance with one or more embodiments of the invention.

Map Matching

Returning to FIG. 1, when a new on-board image 116 is captured by the navigation camera, embodiments may first perform a feature detection/tracking step 118 on the query image. Matching (i.e., feature extraction and matching 130) with the stored map 110 is implemented as a map-to-image matching, guided by a pose prior from the on-board state estimator.

Matching with Pose Prior

Given a pose from the on-board estimator and its associated uncertainty, the map keypoints 204 are reprojected to the camera image 202, as illustrated in FIG. 2. For each visible map keypoint 204, embodiments search for matches within a search window 210.

To efficiently retrieve all image features within this window, embodiments use a K-D-tree search with L1 distance by building apriori a K-D-tree for all image feature coordinates. The size of each search window (i.e., the different pixel blocks in the lower left corner) is based on the point reprojection uncertainty $\Sigma_{\{u,v\}}$, which depends on the pose uncertainty and the 3D point uncertainty $\Sigma_p$. Specifically, let P be the 3D coordinates of a map keypoint with its reprojection function:

$$f = \Pi(R^T(P-t)) \quad (1)$$

where {R, t} is the camera pose with respect to the map and Π is the projection to image coordinates in pixels. The point reprojection uncertainty may be obtained through first order error propagation:

$$\Sigma_{\{u,v\}} = \frac{\delta f}{\delta \theta} \sum_\theta \frac{\delta f^T}{\delta \theta}, \theta = \{P, t, \phi, \chi, \psi\} \quad (2)$$

where $\{\varphi, \chi, \psi\}$ is orientation expressed in pitch, yaw and roll. This representation may be utilized due to interpretability and in experiments $\Sigma_\theta$ may be set as a diagonal matrix. The pose uncertainty can be derived from different sources: the EKF (Extended Kalman Filter) covariance of the visual-inertial odometry estimator, backpropagation of the uncertainty from past non-linear pose optimization, or by assessing the expected pose error in Monte-Carlo experiments.

The search window is then simply defined as a squared bounding box with a side length of: 2\*3 max($\sigma_u$, $\sigma_v$) where $\sigma_u$ and $\sigma_v$ are the diagonal entries of $\Sigma_{\{u,v\}}$, leading to a high likelihood (99.73%) that the correct match is located within the search area.

Computing $\Sigma_{\{u,v\}}$ for each visible map keypoint is computationally expensive. Thus, embodiments of the invention may use a 2D look-up table corresponding to a grid overlaid on the query image (FIG. 2) for storing the computed search window sizes and use the following algorithm: For each visible map keypoint, embodiments first check if the respective bin in the look-up table corresponding to the keypoint's projected image coordinates has a search window size associated to it. If empty, $\Sigma_{\{u,v\}}$ is computed, and the resulting window size is then stored in the look up table. If the bin already has a value, the uncertainty computation is skipped and the stored value is used. As a result, nearby keypoints use a similar search window size.

To match image features to a map feature, the distance between the map feature descriptor and the descriptors of each image feature within the search area may be calculated and the feature with the smallest descriptor distance may be selected as the corresponding match.

Outlier Rejection and Estimating Global Pose

Outlier rejection of false matches happens in two steps. First, a ratio test may be applied—as proposed in [Lowe]—to obtain the ratio between the descriptor distances to the 1st and 2nd best match within the search window. If the number of image features within a search window is less than 10, more image features outside the search window may be sampled during the second nearest neighbour calculation.

The matches are then sorted and the top 200 matches with lowest ratio values in the whole image are selected. This simple criteria may be very effective in increasing the matches' inlier ratio.

In a second step, a RANSAC based PnP algorithm correspondences are applied to calculate a closed form solution of the PnP problem in order to find a maximum inlier set.

The final inlier set is then used in a non-linear least-squares pose estimation step that minimizes the reprojection error. If fewer than 10 inliers with reprojection error less than 2 pixels are found, the matching process is declared failed.

Experimental Evaluation

Embodiments of the invention were tested both with simulated data and data acquired in UAS flights. Performance is evaluated throughout this section as the localization success rate, i.e., the percentage of frames where an estimated location error was less than a given error bound.

Synthetic Datasets

Figure 4:
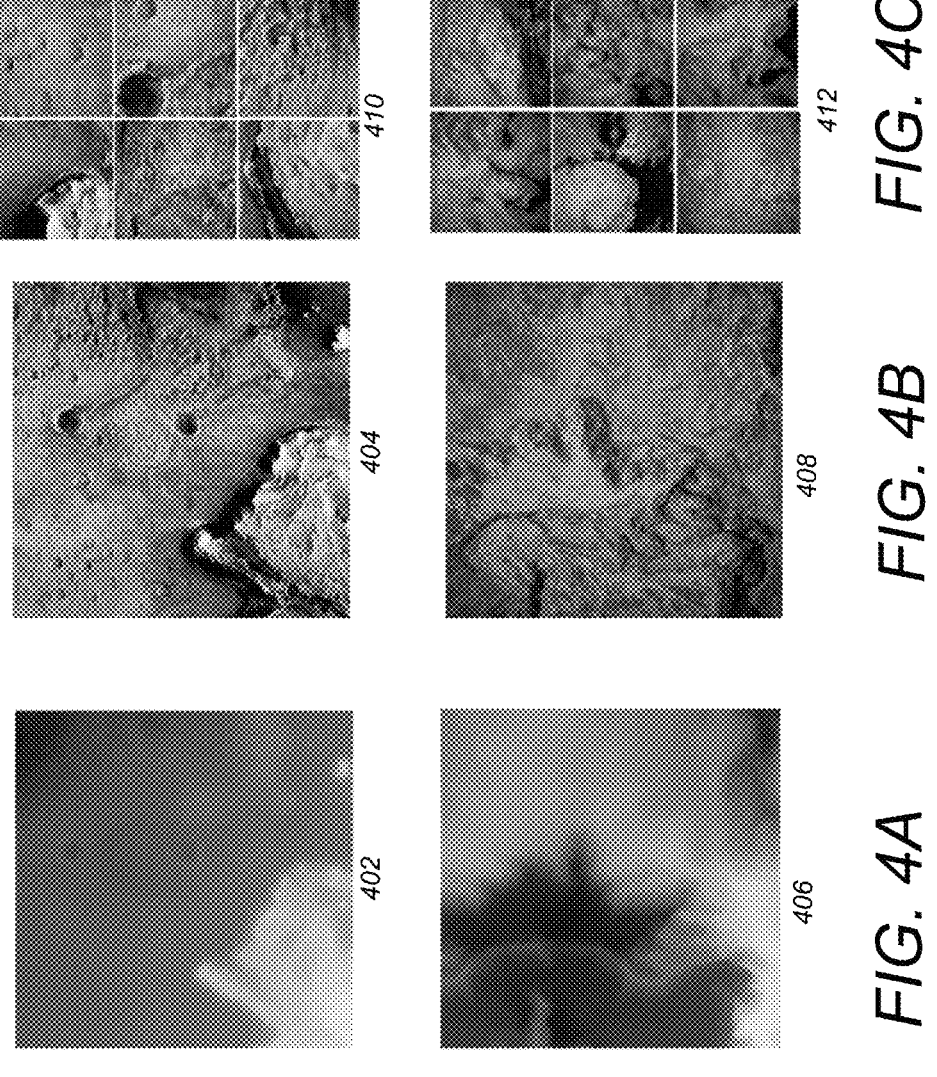
FIGS. 4A-4C illustrate DEMs (height shading coded) (FIG. 4A), ortho-images maps (FIG. 4B), and rendered views (FIG. 4C) used in situation experiments in accordance with one or more embodiments of the invention.

Simulated data sets were generated using AirSim [Shah] which deploys Unreal Engine 4 as the rendering back end. Two different map sources were used for the experiments. FIGS. 4A-4C illustrate DEMs (height shading coded) (FIG. 4A), ortho-images maps (FIG. 413), and rendered views (WIG. 4C) used in simulation experiments in accordance with one or more embodiments of the invention. The top row illustrates a Jezero dataset and the bottom row illustrates a Canyon dataset. In particular, image 404 illustrates a Jezero cropped version of a HiRISE ortho-image and image 402 illustrates a DEM of the Perseverance landing site at Jezero Crater on Mars. The second illustrates Canyon a textured 3D model available in the Unreal Engine marketplace that was rendered using an orthographic projection model (i.e., an ortho image 408 and a DEM image 406). The size of both ortho-images 404 and 408 is 4096×4096 pixel. The Jezero map (ortho-image 404 and DEM 402) has a pixel resolution of 1 m/pixel while the Canyon map (ortho-image 408 and DEM 406) has a pixel resolution of 0.3 m/pixel. The rendered view for Jezero is shown at 410 and for Canyon at 412.

For both maps, individual data sets were created consisting of 1000 query images, sampled randomly for different camera locations in the map frame. The query image size was 512×512 pixels and the camera had a field of view (FOV) of 90°. To assess robustness to different types of viewpoint transformation between the query images and the orthographic map image (i.e., scale changes, and rotations), 3 different datasets were generated for each map:

In the first dataset, the viewpoint altitude was randomized above ground level (AGL) within an interval while keeping the camera pointing down and aligned with the map coordinate frame. In the second dataset, the camera pitch angle (rotation around the camera x-axis) was randomly sampled in an interval between [45°, 45° ] while the altitude above ground was kept constant at a height where the query image resolution (pixel footprint on the ground) corresponded to the ortho-image resolution (i.e. 110 m for the Canyon map and 300 m for the Jezero map). In the third dataset, camera yaw (rotation around the viewing axis) s randomly sampled in an interval between [0°, 360°] while altitude above ground level was kept constant at the same height as in dataset 2, and the camera pitch angle was set to 0 (nadir pointed).

Selecting a Suitable Feature Detector and Descriptor

A fundamental question for a feature-based matching approach is the selection of an appropriate feature detector and descriptor to match features over different modalities such as images taken with different cameras, at different times of the day, or with significantly different perspectives. To guide a selection, a framework may be evaluated using a variation of feature detectors and descriptors on the synthetic datasets described above. The comparison included SIFT [Lowe], SURF [Bay], ORB (Oriented Fast and Rotated BRIEF) [Rublee], and SuperPoint [DeTone] features. For SIFT, SURF and ORB embodiments used the OpenCV implementation. For SuperPoint publicly available pre-trained weights were used. No further training was performed.

To evaluate the performance of the different feature implementations, tests were conducted with the synthetic data sets, limiting the number of detected features per image to 1000. Cumulative success rates for different camera viewpoint tests and the two datasets were then evaluated (e.g., the altitude, pitch, and headings for Jezero and Canyon were plotted and analyzed. Note, that no pose prior was used during the evaluation, and matches were calculated using an exhaustive search to evaluate the uniqueness of the descriptor with a larger candidate set.

SIFT outperforms the other descriptors in all datasets, leading to better localization results and also a higher percentage of localized query images. SuperPoint, the only learning-based descriptor, shows poor scale and rotation invariance, which indicates that the network training was not effective in learning a scale and rotation invariant feature descriptor. Embodiments of the invention also compared the matching accuracy (percent-age of correct feature matches) and keypoint repeatability (percentage of detected map keypoints in the image) [Mikolajczyk] between SIFT and SuperPoint. More specifically, the matching accuracy and feature repeatability in query images acquired at varying altitude (Canyon dataset) were compared. Although the repeatability is high for SuperPoint, the matching accuracy drops significantly if one moves away from the equal map and query image resolution altitude of 110 m AGL. This indicates that the poor performance of SuperPoint is not due to the learned feature detector but rather the learned descriptor not being scale invariant.

As a result of this evaluation, embodiments of the invention selected SIFT as the feature detector and descriptor.

Localization Under Changing Illumination

Flights on Mars are most favorable during the morning because of wind and atmospheric density conditions, but HiRISE images are in general acquired in the afternoon. This is a major challenge for vision-based absolute localization since changing illumination and shadows in 3D terrain alter the appearance of terrain in an on-board query image significantly.

To analyze the impact of illumination changes between the query image and the ortho-image map, embodiments of the invention created query image datasets with different sun elevation angles for the Canyon scene and matched these against a map rendered with a sun inclination angle of 90°

Figure 5:
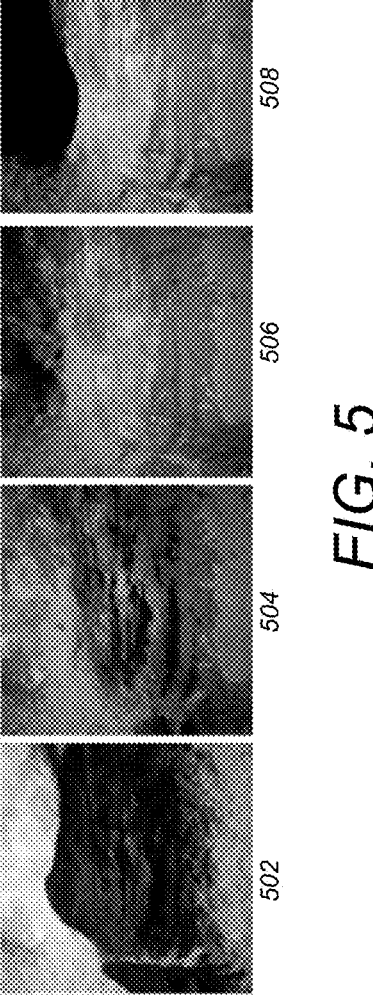
FIG. 5 illustrates an example of images from the same viewpoint rendered with different sunlight angles in accordance with one or more embodiments of the invention.

(noon) and 120° (afternoon). An example of images from the same viewpoint rendered with different sunlight angles is shown in FIG. 5 In particular, FIG. 5 illustrates an example view of the canyon environment rendered with different sun inclination angles—30° 502, 60° 504, 120° 506, and 150° 508.

Figure 6A:
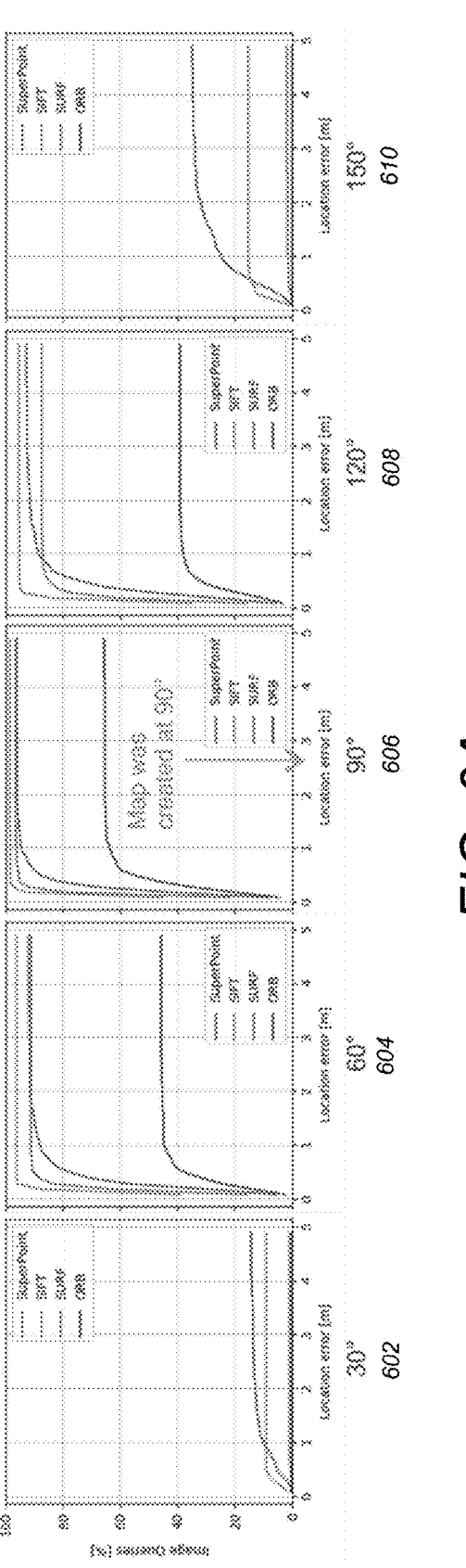
FIG. 6A shows the cumulative localization success rate for query images taken at different sun inclination angles and an ortho-image taken at noon in accordance with one or more embodiments of the invention.

FIG. 6A shows the cumulative localization success rate for query images taken at different sun inclination angles and an ortho-image taken at noon (90° sun inclination) (matching with exhaustive search) in accordance with one or more embodiments of the invention. In other words, FIG. 6 shows different feature descriptors for an ortho-image that was captured at noon (90° sun inclination) and query images taken at 30° 602, 60° 604, 90° 606, 120° 608, and 150° 610 sun inclination. No pose prior was used for the matching process. All feature descriptors show poor performance for drastic illumination changes (i.e., for 30° 602 and 150° 610) but interestingly SuperPoint performs slightly better than SIFT at 30° and 150° sun inclination.

To evaluate, if a guided matching process can improve the success rate, a pose prior may be introduced by perturbing the ground-truth pose from the simulation with Gaussian noise to simulate a pose estimate with a corresponding uncertainty with $3\sigma t, t, t=3$ m and $3\sigma_{\varphi,\chi,\psi}=2°$. These values were selected based on prior evaluations of VIO performance during UAS flights, and used as $\Sigma_{\{u,v\}}$ for the uncertainty propagation during the sigma bounded search.

Figure 6B:
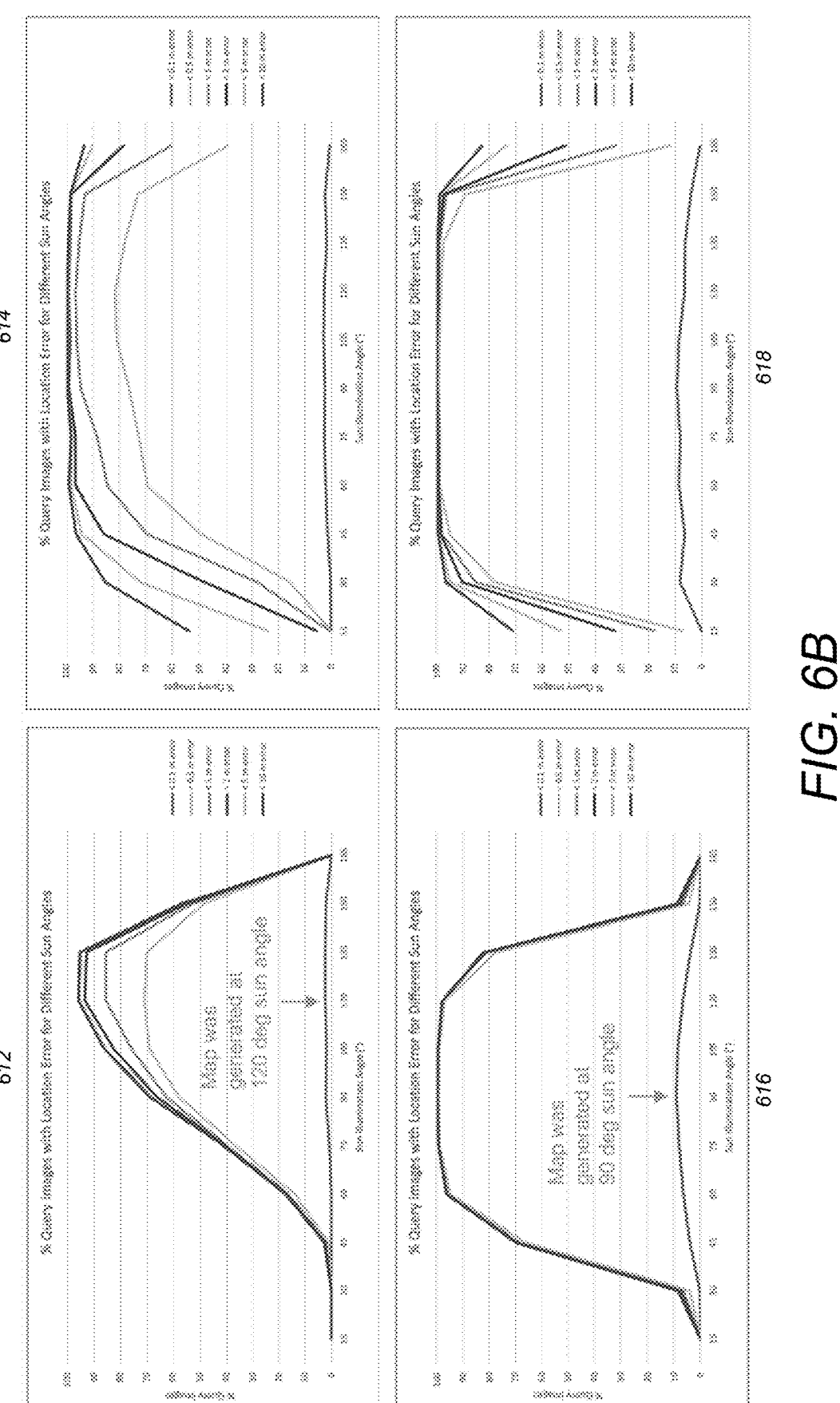
FIG. 6B illustrates exemplary sun inclination test results with query images taken at different times of the day registered with a map using SIFT features in accordance with one or more embodiments of the invention.

Embodiments of the invention may also compare results obtained with exhaustive search matching and matching using the pose prior (σ-bounded search) for the sun inclination test. FIG. 6B illustrates exemplary sun inclination test results with query images taken at different times of the day registered with a map taken in the afternoon 612 and 614 and at noon 616 and 618 using SIFT features in accordance with one or more embodiments of the invention. The left column 612 and 616 illustrates results from an exhaustive search and the right column 614 and 618 illustrate results from a σ-bounded search. Using a pose prior in the matching process increases the time window for flights where a high percentage of query images yield accurate localization results, both for a map created at noon and in the afternoon. This is a good indication that a pose-prior can increase matching results significantly in challenging lighting conditions. It may be noted, however, that this test is highly dependent on the terrain shape, and further investigation may be needed to generalize this result.

Results from UAS Flights

Figure 7:
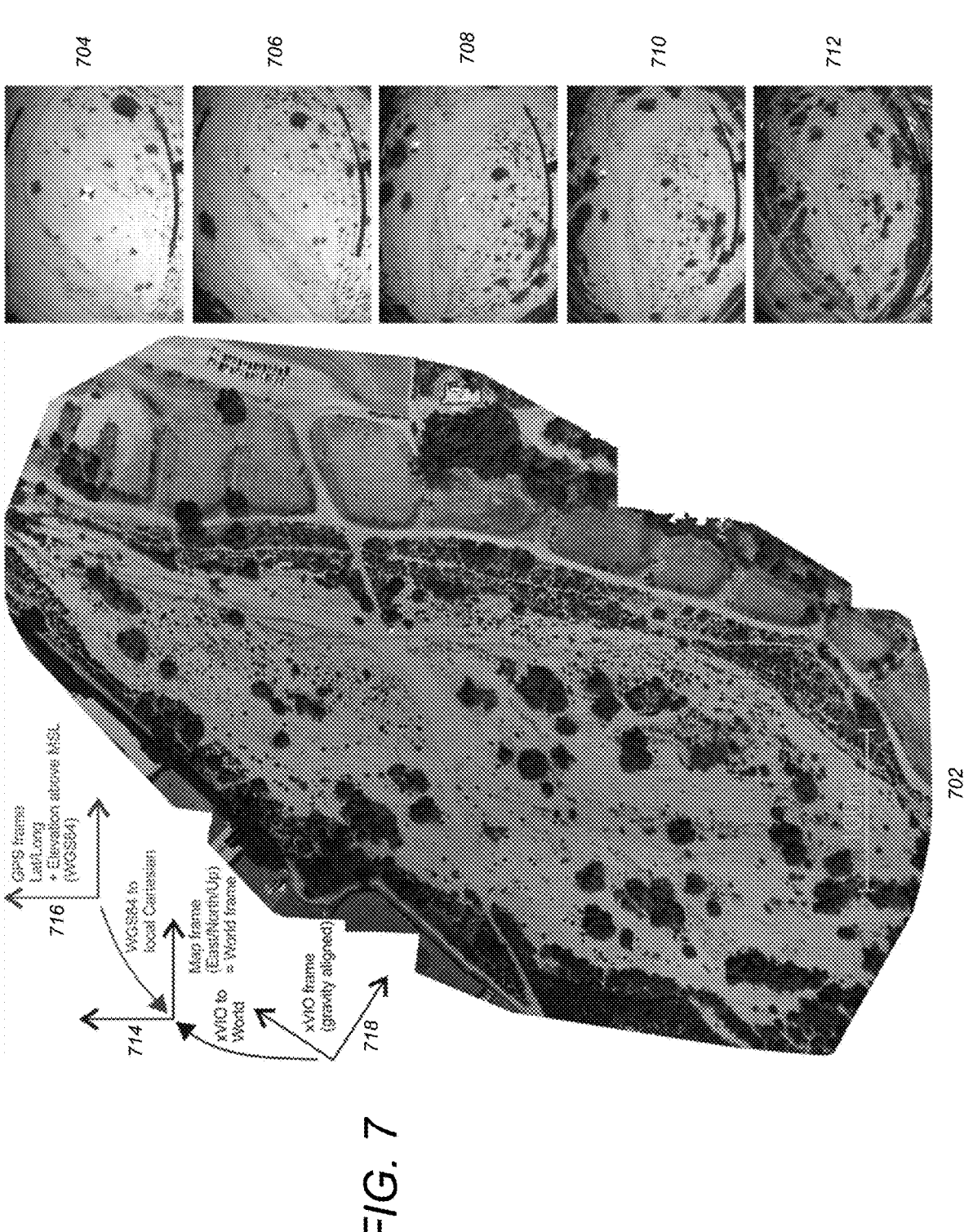
FIG. 7 illustrates the UAS experiment at Hahamongna with an ortho-image and navigation camera images in accordance with one or more embodiments of the invention.

To evaluate an algorithm of embodiments of the invention with non-simulated data, UAS data acquisition flights were performed in the Hahamongna watershed park near JPL (Jet Propulsion Laboratory) at different altitudes between 12 m and 100 m above take-off point. To create a map from the experiment area, a Parrot Anafi equipped with a gimbled 4K camera was deployed and an ortho-image and a DEM at 25 cm/pixel were calculated with commercial software (Pix4Dmapper). FIG. 7 illustrates the UAS experiment at Hahamongna with an ortho-image 702 (with 25 cm/pixel resolution), and navigation camera images at 12 m 704, 20 m 706, 35 m 708, 50 m 710 m, and 100 m 712 flight altitude above a take-off point.

Figure 8:
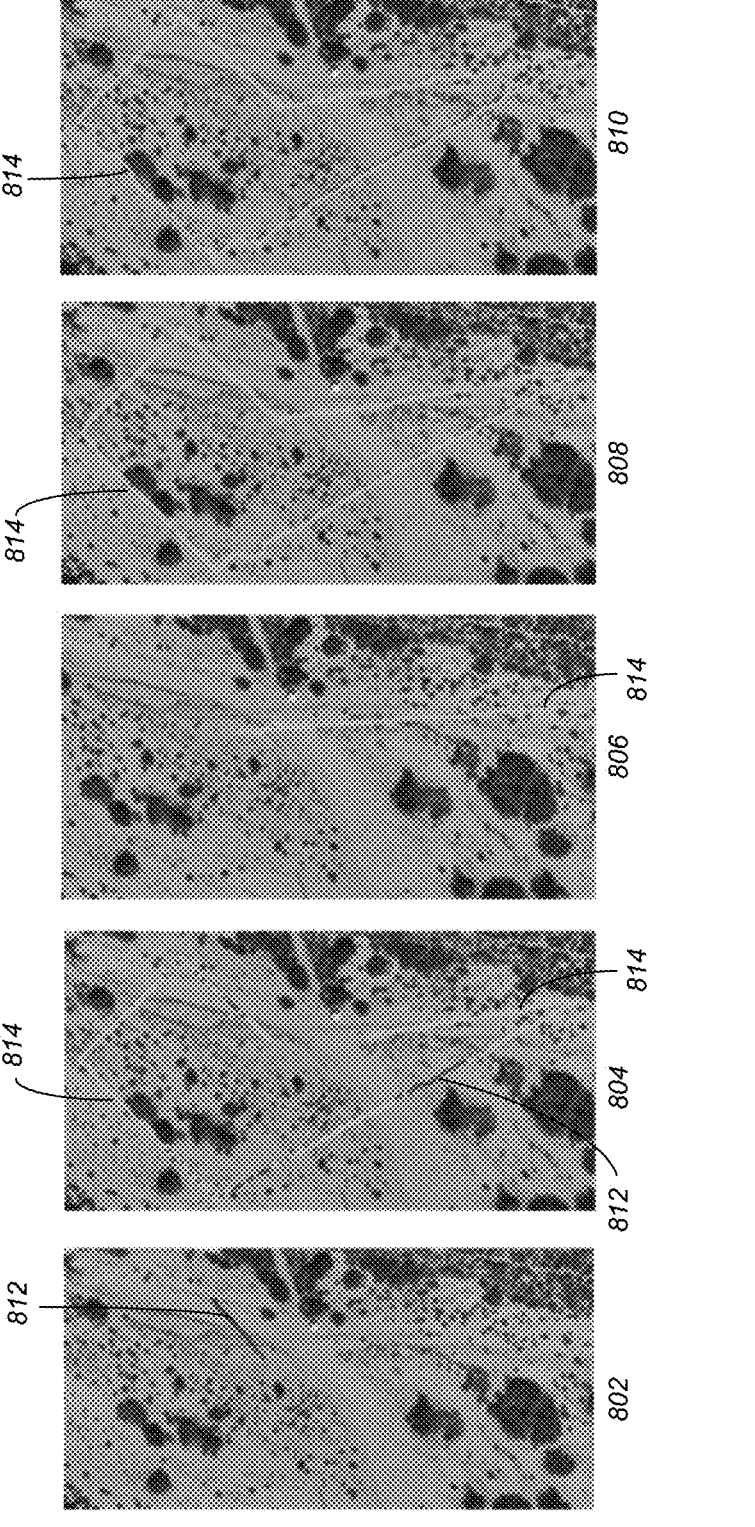
FIG. 8 illustrates the localization during UAS flights at different altitudes in accordance with one or more embodiments of the invention.

The map area is about 600 m×500 m large and images were captured around 3:37 PM. Map creation followed the steps laid out above which resulted in a map database of approximately 43000 feature entries. To evaluate localization at different altitudes, 5 data acquisition flights were performed at altitudes of 12 m, 20 m, 35 m, 50 m, and 100 m above take-off point. Flights were executed between 12:49 PM and 4:11 PM. FIG. 8 illustrates the localization during UAS flights at different altitudes—12 m 802, 20 m 804, 35 m 806, 50 m 808, and 100 m 810. The map detail is overlaid with the UAS trajectory with 812 reflecting GPS positions and 814 reflecting localization results on top of GPS positions (matching with exhaustive search). In this regard, Images from the on-board navigation camera—which was the same model as used by the Mars Helicopter Ingenuity (Omnivision OV7251, VGA resolution and approximately 110° horizontal field of view)—together with data from IMU, LRF, and GPS position data, acquired by an on-board RTK-GPS module, were recorded and combined into ROS bag files for off-line processing.

Individual navigation images were undistorted and matched against the map database as described above. To derive a pose prior, a Range-VIO (xVIO) [Delaune 3] was deployed to estimate UAS poses from image, IMU and LRF data. xVIO provides poses in a gravity aligned local frame that depends on the take-off position—with the origin at the IMU location and the orientation aligned with the IMU axis.

tion results using exhaustive search for feature matching (with trajectories 814 shown in FIG. 8). Table 1 shows the percentage of query images that resulted in a localization result below a position error threshold. The left number (in each altitude above take-off point column) is the percentage with respect to all images recorded, allowing an estimate of the success rate with respect to the total number of frames. The right number (in each altitude above take-off point column) is the success rate with respect to the number of images that returned a localization result, highlighting the accuracy of localization results.

Note, that equal query and ortho-image resolution of 25 cm/pixel corresponds to a flight altitude of approximately 80 m. Feature detection and matching uses SIFT features as described before. SIFT performs well until the scale change becomes too large, resulting in no matches in the 12 m altitude flight, despite sufficient map features visible in the query image. The resolution at 20 m (5× scale difference) represents an edge case, where feature matching starts to break down. Above 20 m, embodiments of the invention may provide a localization result for each query image with localization accuracy better than 5 m for all frames and better than 2 m for the vast majority of frames.

TABLE 1

| Error threshold | Altitude above take-off point | | | | |
| --- | --- | --- | --- | --- | --- |
| | 12 m | 20 m | 35 m | 50 m | 100 m |
| 1 m | 0.0/0.0% | 68.7/97.5% | 80.8/80.8% | 83.3/83.3% | 29.5/29.5% |
| 2 m | 0.0/0.0% | 69.5/98.2% | 99.2/99.2% | 100.0/100.0% | 96.0/96.0% |
| 5 m | 0.0/0.0% | 69.6/99.0% | 100.0/100.0% | 100.0/100.0% | 100.0/100.0% |
| 10 m | 0.0/0.0% | 70.2/99.4% | 100.0/100.0% | 100.0/100.0% | 100.0/100.0% |

In order to transform xVIO poses into the map frame and evaluate the localization result with the vehicle GPS position, 3 coordinate frames are established (as illustrated in FIG. 7):

a north aligned Map frame 714 which also serves as the World frame;

the GPS frame 716 (WGS84) to provide position ground truth; and and the gravity aligned xVIO frame 718 that is used by the on-board state estimator.

The transform between the GPS frame 716 and the Cartesian Map frame 714 follows the GPS to UTM transform with a local origin at the take-off position, whereas the transform between the xVIO frame 718 and the Map frame 714 depends on the initial yaw heading of the vehicle before take-off. In the absence of a reliable IMU to magnetometer calibration, the GPS trajectory may be aligned with the xVIO trajectory during the first 20 seconds of horizontal flight to recover the xVIO frame orientation in the north aligned Map frame 714.

Pose priors were derived by transforming the xVIO pose and covariance outputs into the Map frame 714. In tests, xVIO poses were calculated off-line from recorded image, IMU and LRF data, for flights up to 20 m altitude. Beyond 20 m altitude, the laser range finder did not provide reliable ranging data, preventing xVIO from producing accurate pose priors. As a result, one may first evaluate localization performance for all flights using the exhaustive search matching schema, and then additionally compare results obtained with pose prior matching in the two flights at 12 m and 20 m altitude.

Table 1 illustrates the localization success rate with the percentage of query images with position error less than threshold. More specifically, Table 1 illustrates the localiza- As can be seen in Table 2, the use of a pose prior helps increase the number of query images that provide a localization result for the 20 m flight, but accuracy remains roughly the same for frames with localization results. In this regard, Table 2 illustrates a comparison of localization success rate using exhaustive search and pose prior for UAS flight at 20 m altitude: percentage of query images with position error less than threshold. The left number is with respect to total number of query images; and the right number is with respect to all query images with valid localization.

TABLE 2

| Error threshold | Exhaustive Search | Pose Prior |
| --- | --- | --- |
| 1 m | 68.7/97.5% | 84.5/97.6% |
| 2 m | 69.5/98.2% | 85.4/98.6% |
| 5 m | 69.6/99.0% | 85.7/99.0% |
| 10 m | 70.2/99.4% | 85.8/99.1% |

Mars 2020 Descent Images

To test the method on Mars imagery, the MBL algorithm was used to register the LCAM images acquired during the Mars 2020 descent to the HiRISE map of Jezero crater. The algorithm was able to provide a global reference between 7 km and 110 m altitude. In the absence of a pose prior in the global frame, an extensive search matching was restricted to the HiRISE map detail. Individual matching results overlaid on LCAM images were then evaluated.

Conclusions

Embodiments of the invention demonstrate that a vision-based image registration method that matches images from an on-board navigation camera to surrogate orbital image maps can be used to accurately estimate a global position of an aerial vehicle. The descriptor based method of embodiments of the invention uses SIFT features and a guided matching algorithm leveraging a pose prior to predict search areas of map features within the query image. The use of a pose prior improves matching results not only for large viewpoint changes, but also if the map and the query image are collected during significantly different times of day. Additional embodiments may include improvements to the matching approach for low altitude flights and changing illumination over high-relief terrain, and incorporating the global reference directly into the state estimator.

Vision Loop Closure Detection

Introduction

As described above, there are many locations on Mars of scientific interest that are out of reach for current rover systems because of challenging terrain, and that cannot be investigated with sufficient resolution from orbiting satellites. Aerial vehicles could be a game changer for how we conduct science on Mars as they are mostly unaffected by difficult terrain. In 2021 NASA's Mars Helicopter Ingenuity successfully executed the first powered flight on another planet, paving the way for a future Mars Science Helicopter (MSH) mission concept to carry a multi-kg science payload over complex 3D terrain. With anticipated flight ranges of multiple kilo-meters (up to 10 km), and an expected cruise altitude of up to 200 m above ground level (AGL), potential mission scenarios include in-situ sampling of minerals at Mawrth Vallis and cliff inspections of water ice at Milankovic crater [Bapst]. Such mission scenarios require two critical capabilities:

(1) precision data acquisition at previously identified science targets; and (2) in-flight detection of safe landing sites in hazardous terrain [Brockers 1] and the ability to return to a detected landing site or the take-off position if no new landing site can be found during a flight.

Thus, the ability to accurately return to previously visited locations is crucial for the success of future science missions and to ensure the vehicle's safety. Since on-board state estimation accumulates drift due to the lack of a global fix [Delaune 2], [Delaune 4], and a map-based localization approach based on orbital imagery [Brockers 2] requires higher flight altitudes because of the limited resolution of available Mars orbital imagery, a new approach is required to enable precision loop closure at low altitudes, and where orbital imagery is not available or unreliable due to 3D terrain.

Embodiments of the invention provide a vision-based loop closure detection system for precision navigation with respect to previously visited locations to enable the navigation capabilities necessary to carry out MSH science missions.

Contributions of this work may include:

An efficient BoW (bag of words)-based loop closure system that detects image-to-image correspondences between the navigation camera and a database of geo-tagged keyframes while running at framerate on the computationally constrained platform of a future MSH.

Evaluation of Mars-optimized visual vocabularies in terms of feature type, vocabulary size, weighting scheme, and scoring function on simulated data to maximize the performance-runtime trade-off Evaluation of different combinations of geometrical consistency checks to maximize the performance-runtime trade-off Validation of the proposed system with zero false positives on both simulated and real-world data, including flight data from Ingenuity Related Work Visual place recognition (VPR) is a crucial component in SLAM algorithms and has gathered more attention with the increasing focus on long-term autonomy of mobile systems. VPR aims to find associations between the visual input data and the internal representation of the world. Depending on this representation, loop closures are detected by making 3D-3D associations [Clemente], 2D-3D associations [Williams], or by establishing 2D-2D correspondences. Since a 3D map is only available during landing site detection on MSH, embodiments of the invention may focus on 2D-2D, i.e., image-to-image associations.

Handcrafted Feature-Based

Traditionally VPR has been done by matching local feature descriptors. Using clustering methods, such as the BoW method, the computational effort can be reduced while retaining matching accuracy [Sivic], [Nistér].

Subsequent works have proposed modifications and improvements to BoW-based VPR methods. To combine the advantages of small vocabularies, i.e., a high probability of assigning the right word, and large vocabularies, i.e., large discriminative power, the Hamming embedding has been proposed in [Jegou], which adds a binary signature that further subdivides the descriptor space. Soft-assignment addresses the same problem by mapping each feature descriptor to multiple visual words instead of only the closest one [Philbin].

FAB-MAP [Cummins] casts the recognition problem in a probabilistic manner by learning a generative model of a place's appearance. This approach showed good resilience against perceptual aliasing.

While these extensions of the original BoW approach offer better recall rates, they come with greater computational costs.

The introduction of binary descriptors such as BRIEF (Binary Robust Independent Elementary Features) [Calonder] and its rotation invariant extension ORB [Rublee] lead to the development of computationally efficient BoW-based methods. The work of [Galvez-Lopez] first introduced a visual vocabulary that discretizes a binary descriptor space using the efficient Hamming distance instead of the Euclidean distance. Their work is available in the form of the DBoW21 open-source library. The BoW approach, and in particular the DBoW2 implementation of it, is used by many popular open-source SLAM systems, such as ORB-SLAM [Mur-Artal 1], [Mur-Artal 2], [Campos], VINS-Mono [Qin], OpenVSLAM [Sumikura], and BAD SLAM [Schops].

In the context of planetary exploration, the work of [Giubilato] uses a multi-model approach to detect loop closures on the LRU rover by using both point cloud matches and image associations made with a BoW approach using the DBoW2 library as well.

Learned Feature-Based

In recent years, advances in deep learning have been applied to the VPR task. In [Arandjelovic], existing neural networks such as AlexNet are cropped at the last convolutional layer, and a custom layer is added to create discriminative image representations. Other learning-based methods incorporate semantic information to distinguish different places [Naseer].

The authors of [Latif] use Generative Adversarial Networks to tackle the challenging task of finding loop closures across different seasons by reformulating the problem as a domain translation task.

While learning-based methods produce state-of-the-art results, embodiments of the invention may not utilize them due to their requirement of dedicated accelerated hardware for real-time inference, their need for large training datasets, and the fact that they address problems, such as dynamic objects, occlusion, seasonal changes, which are not present on Mars.

System Overview

Figure 9:
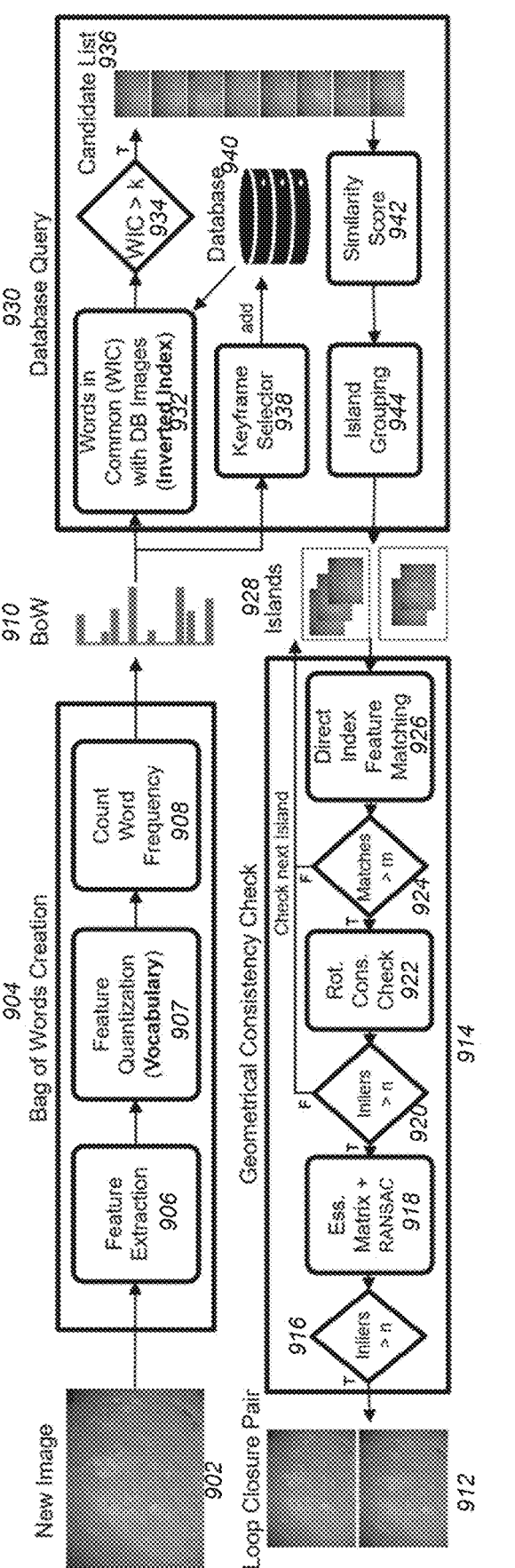
FIG. 9 illustrates processing steps in accordance with one or more embodiments of the invention.

There are three distinct processing steps: BoW creation, Database query, and Geometrical consistency check, which are shown in FIG. 9. The description below provides a more detailed description of the individual steps.

To generate the BoW representation, ORB features are extracted 906 from the navigation camera and quantized 907 into visual words using a hierarchical vocabulary [Gálvez-López]. The weighted word frequencies 908 are then used to create the BoW histogram 910. The next step aims to find potential loop closure candidates by querying the keyframe database. Using the inverted index 932, the list of candidate frames 936 that share a minimum number of words with the query image is determined 934. Their similarity score 942 is calculated and overlapping candidate frames are grouped 944 into islands 928. The output of this step is a list of islands 928 sorted by decreasing order of the sum of the similarity scores of their respective images.

The final processing step rejects false loop closures by enforcing geometrical consistency 914. The image with the highest similarity score 942 in the first island 928 is passed to the direct index (DI) feature matching 926. If there are enough feature matches 924, a rotational consistency (ROT) check 922 is performed. If the remaining number of matches is above a given threshold 920, the epipolar constraint is applied by estimating the essential matrix using the 5-point algorithm within a RANSAC scheme 918 [Nistér 2]. Finally, if the number of matches fulfilling the epipolar constraint is above a certain threshold 916, the image is accepted as a loop closure 912. The low runtime of the DI matching 926 and ROT check 922 allows the processing of multiple islands. Up to 10 islands are checked if the frames are rejected after DI matching 926 or ROT check 922. The system will not run at 30 Hz if the essential matrix is estimated more than once. Thus, if a frame is rejected at this stage, the process moves on to the next image.

Visual Place Recognition

Bow Creation 904

The first step of the loop closure detection is the creation 904 of the BoW representation of the navigation image 902. This representation may be utilized because it allows for an efficient comparison with other images and since it can be combined with the inverted index to do fast database queries [Sivic]. The entries in the BoW vector are the weighted frequencies of the words present in the image 902. The underlying assumption is that images of similar places will have similar visual words at similar frequencies. Thus, taking the difference of the BoW vector will give a measure of how similar or dissimilar two images are. Commonly used scoring functions to calculate the similarity measures are the L1 and L2 norm of the BoW vector differences and the cosine similarity [Nistér 1]. In embodiments of the invention, the L2 norm may be used. The description below explains the experimental results used to make that decision.

In step 904, feature descriptors are assigned to visual words to create the BoW representation. This is achieved by using a visual vocabulary 907 that subdivides the descriptor space. A hierarchical vocabulary tree is used whose size is determined by the branching factor, i.e., the number of children per node, and the number of depth levels. The visual vocabulary is trained offline on a set of images that are representative of the environment that the system will encounter during deployment. A custom Mars simulation is utilized as described herein), to generate training images in sufficient numbers. Out of this set of training images, features are extracted at 906. A hierarchical k-means++ clustering algorithm is then used to subdivide the descriptor space into the visual word clusters [9]. A feature descriptor is assigned to the visual word whose cluster is closest.

Visual words vary in their importance and usefulness to detect loop closures. A weighting scheme is used to incorporate this information into the BoW representation [Baeza-Yates]. Frequent words (i.e., counted in step 908) in the training image set are assigned lower weights since they are less discriminative. The term frequency-inverse document frequency (tf-idf) weighting scheme proposed by [Sivic] is used. The results show that tf-idf weighting works beneficially for one or more embodiments of the invention.

Database Query 930

In the second step of the processing pipeline, the database is queried at 930. Step 930 aims to find a set of loop closure candidate frames. The inverted index 932 is used, which is a data structure useful in order for the BoW approach to be efficient [Sivic]. For each word, the inverted index 932 stores a list of images that contain that particular word. This data structure allows embodiments to efficiently determine which images in the database share a minimum number of words with the query image (i.e., words in common (WIC) >k, where k defines a threshold minimum number at 934) and store them in the candidate list 936. The runtime savings of using an inverted index 932 are more pronounced for larger vocabularies since the number of images in the database 940 sharing a word decreases. For each image in the list, the similarity score 942 is calculated and then used to group the images into islands (at 944) as introduced by [Galvez-Lopez]. The idea is to group overlapping candidate frames into groups referred to as islands 928. The advantages of this grouping are twofold. First, if the query image is located right between two images in the database 940, the individual similarity scores will not be that high, but if one considers these two images as a group and takes the sum of the similarity scores 942, the resulting score will be much higher. Secondly, since the images in an island 928 are overlapping, it suffices to check only one image for geometrical consistency, which allows embodiments to check a larger portion of the candidate lists 936. For each island 928, the sum of similarity scores 942 of the candidate frames within that island is calculated. The database query 930 then outputs a list of islands 938 grouped in descending order according to the island score.

Geometrical Consistency Check 914

The final step of the processing pipeline rejects wrong loop closures. This step is particularly important since false positives, i.e., false loop closures, are worse than missing true loop closures. A wrong loop closure could distort a map beyond repair. The BoW representation has no notion of the geometrical distribution of the detected words. This is advantageous to some extent since it brings an implicit invariance against viewpoint changes with it. On the other hand, it treats images that show a different place but contain similar words as candidate frames.

The description below evaluates different combinations of feature matching and rejection methods to enforce geometrical consistency. This description introduces the methods used in that evaluation.

In terms of feature matching techniques, embodiments of the invention looked at brute-force (BF) matching where an exhaustive search over all candidate pairs is performed, FLANN matching, where a KD-tree is used to approximate the nearest neighbor search to speed up the matching process [Muja], and finally, direct index (DI) matching 926, introduced by [Galvez-Lopez], which reuses the hierarchical clustering of the descriptor space by the visual vocabulary to achieve fast approximate nearest neighbor search. DI matching only considers feature pairs that share a parent node on a predefined level in the vocabulary tree.

Once the feature matches are established (e.g., the feature matches are greater than a threshold m at 924), two checks are considered to verify the loop closure candidates, the 5-point algorithm within a RANSAC scheme 918 to estimate the essential matrix, and a rotational consistency check (ROT) 922. ROT 922 was first proposed by [Mur-Artal 3]. This method calculates the relative angles of the estimated orientations for each feature match pair. These angular differences are binned into bins of predefined size. The inliers are then the feature pairs whose relative angular difference is in the first n largest bins. Checks are performed at 920 and 916 to determine if the number of inliers determined via ROT 922 and RANSAC 918 are greater than a threshold n. The result is the loop closure pair 912.

Figure 10:
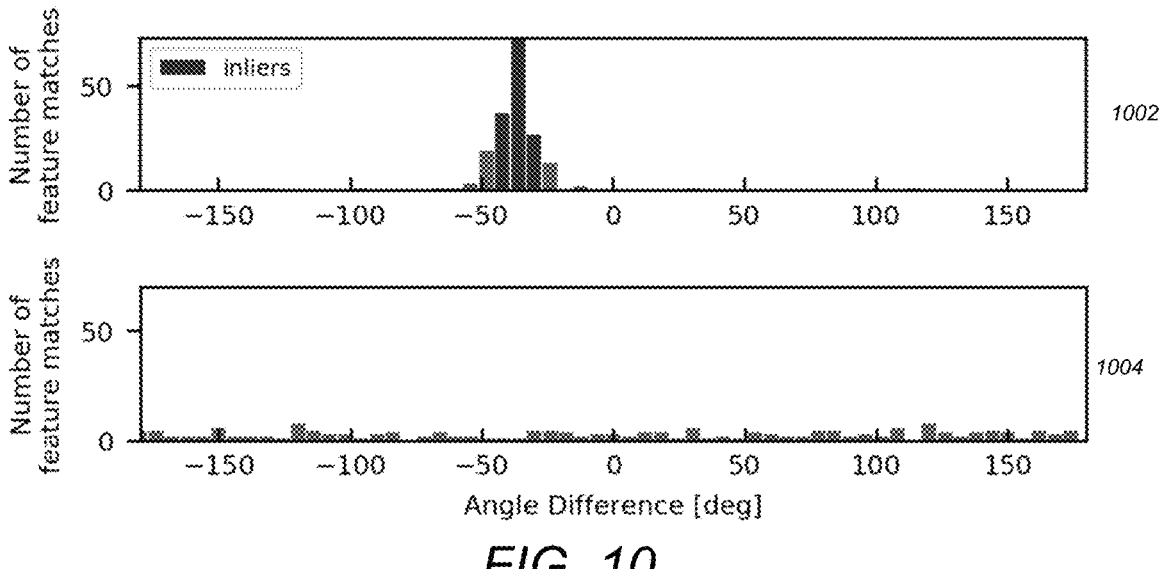
FIG. 10 shows the binned angular differences for a correct loop closure pair and a false loop closure pair in accordance with one or more embodiments of the invention.

FIG. 10 shows the binned angular differences for a correct loop closure pair and a false loop closure pair in accordance with one or more embodiments of the invention. More specifically, FIG. 10 illustrates a rotational consistency check 922 where the chart 1002 reflects a true loop closure with the angular differences all similar. In contrast, chart 1004 illustrates a false loop closure where the angular differences are approximately evenly distributed.

Experiments

Embodiments of the invention run experiments on synthetic data to determine the best vocabulary parameters and geometrical consistency checks methods that maximize the loop closure detection performance and runtime trade-off on data resembling the Martian surface. Furthermore, embodiments of the invention evaluated the performance of the system on simulated flights, on data collected from an Unmanned Aircraft System (UAS), and on flight data from Ingenuity.

Simulation Environment

Synthetic data was generated using the AirSim plugin [Shah] for the Unreal Engine 4. An off-the-shelf Mars environment was used that was augmented by randomly adding rocks to alleviate the problem of ambiguous appearances of different places due to repeating ground texture.

Vocabulary Generation and Evaluation

A large number of training images may be utilized to generate vocabularies 907. The images provided by rovers and landers have the wrong viewpoints compared to the downward-looking camera of a future Mars helicopter, orbital images have the wrong resolution, and the images from Ingenuity are too few. For those reasons, embodiments of the invention use synthetic images for vocabulary generation. Approximately 30000 images were sampled from the simulated Mars environment, covering an area of 8 km×8 km at altitudes ranging from 10 m to 200 m AGL with roll and pitch angles between #10 degrees and unconstrained yaw angles. One half was sampled at 85 degrees sun inclination and the other half at 135 degrees.

To determine the best vocabulary 907, an exhaustive search was performed over the parameter space, which included:

Vocabulary size: $10^2$, $10^3$, $10^4$, $10^5$, $10^6$

Weighting scheme: TF-IDF, TF, IDF, Binary.

Scoring function: L1 norm, L2 norm, dot product

Feature type: SIFT [Lowe], SURF [Bay], ORB [Rublee], FREAK [Alahi], BRISK [Leutenegger], AKAZE [Alcantarilla], and BRIEF [Calonder].

For the vocabulary size, the branching factor was fixed at 10 and the number of depth levels was varied. Vocabularies of more than 1 million words were not considered due to increasing memory requirements for a RAM-constrained embedded system. The vocabularies were generated using the DBoW2 library's implementation of the hierarchical k-means++ clustering algorithm from [Nistér].

Figure 11:
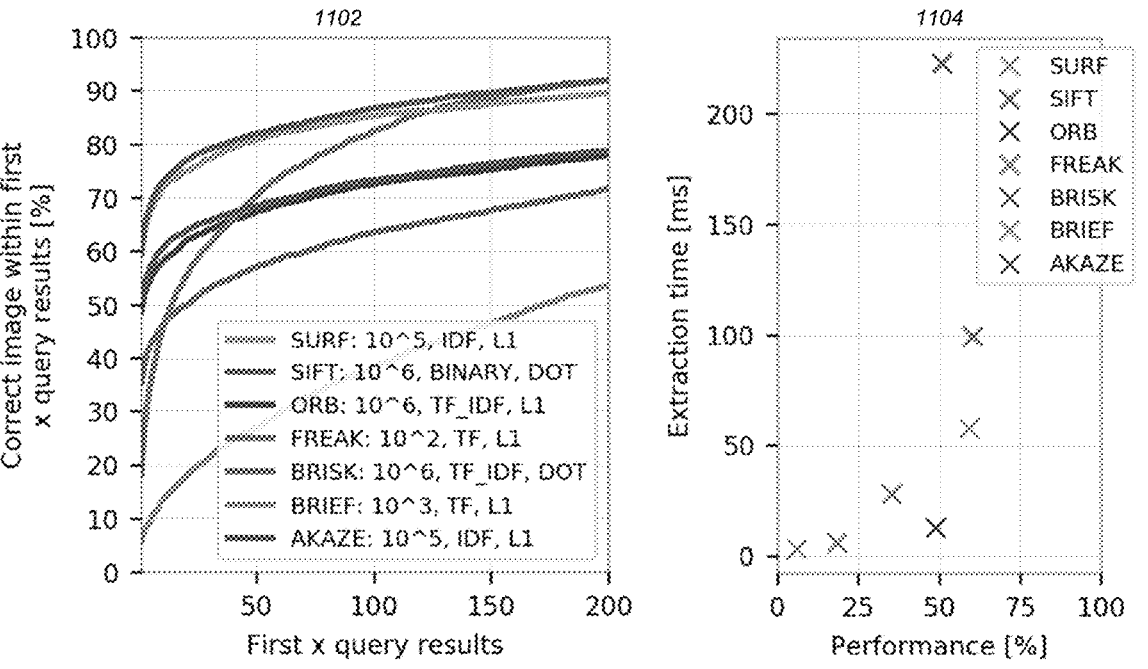
FIG. 11 illustrates results of performing vocabulary configurations for different feature types and feature extraction time-performance tradeoffs for vocabularies of different types in accordance with one or more embodiments of the invention.

The different vocabularies were evaluated by filling the database 940 with 2000 randomly sampled images from the simulation. Another 1000 overlapping image pairs were generated/sampled at a region that is not overlapping with the region used to generate the images in the database. Embodiments then iterated through each test pair, adding the first image of the pair to the database and using the second one as the query image. The 2001 images were sorted in the database in descending order according to their similarity score with the query image. The added test image was removed from the database and the process was repeated for the remaining test pairs. The evaluation metric used to determine the best vocabulary was the percentage of the test cases where the test image was the first entry in the ordered database. The results of the best performing vocabulary configurations for different feature types are shown on the left plot 1102 in FIG. 11, while the right plot 1104 visualizes the runtime-performance trade-off. More specifically, plot 1102 of FIG. 11 illustrates the best vocabularies for each feature type while the right plot 1104 illustrates the feature extraction time performance trade-off of the best vocabularies for each feature type.

The BRIEF descriptor has poor performance due to its missing rotational invariance. The BRISK descriptor has poorer performance than ORB at a higher extraction time. The FREAK descriptor also has poor performance but surpasses ORB if enough query results are considered. AKAZE has a similar performance as ORB but at a much higher extraction time. SIFT and SURF are comparable in performance, with SURF requiring approximately just half the extraction time. In terms of runtime-performance trade-off, ORB and SURF vocabularies offer the best solution. ORB was chosen for its sub-framerate extraction time and because an ORB-based loop closure system could reuse the tracked features of the on-board Range-VIO (xVIO) [Delaune 2], which also uses the FAST detector for feature extraction.

Figure 12:
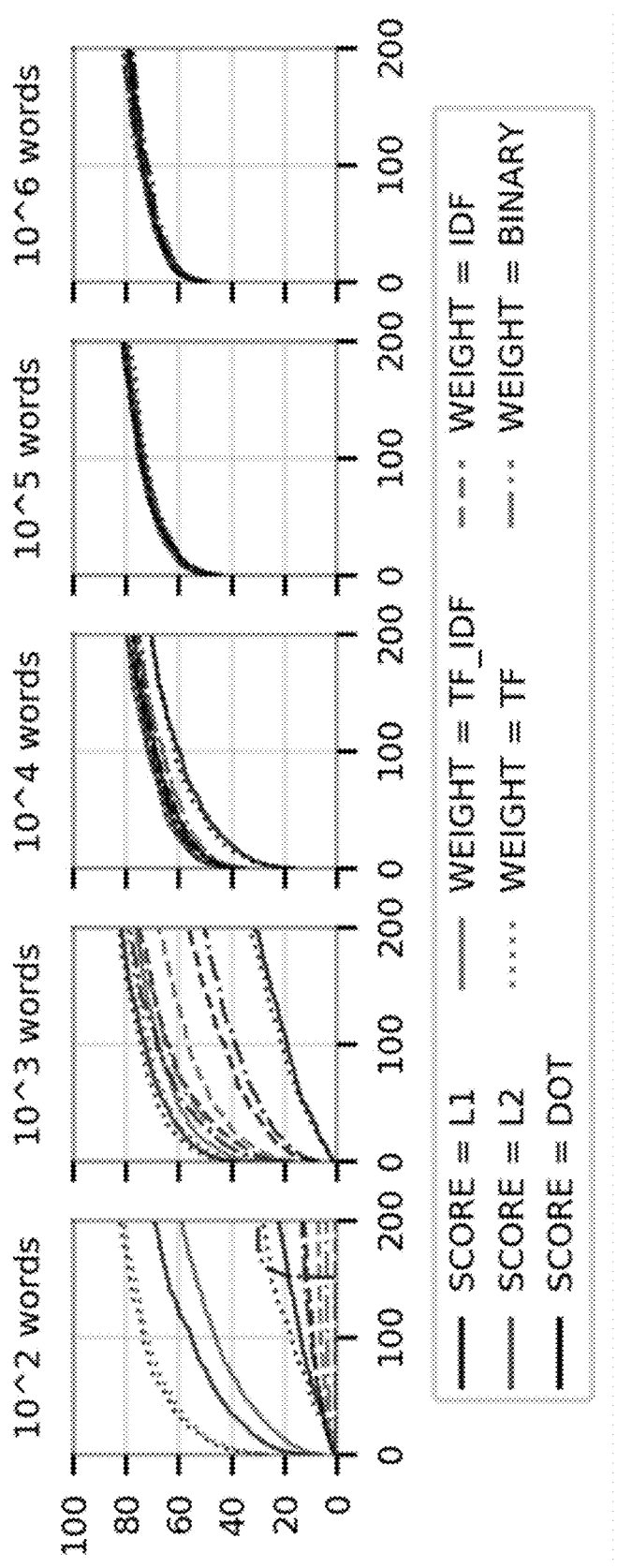
FIG. 12 shows the performance of different ORB vocabularies in accordance with one or more embodiments of the invention.

FIG. 12 shows the performance of different ORB vocabularies. More specifically, FIG. 12 illustrates the performance of ORB vocabularies for different sizes, weighting schemes, and scoring functions. The different line shading depicts the scoring function and the line type the weighting scheme. For vocabularies larger than 105, the performance is converging and consistent across different weighting and scoring combinations.

Geometrical Consistency Checks Evaluation

To arrive at the proposed geometrical consistency checks, embodiments of the invention compared different feature matching and outlier rejection methods. In terms of feature matching, brute-force matching (BF), Fast Library for Approximate Nearest Neighbors (FLANN), and Direct Index matching (DI) were examined. The selection of the 4th depth level as reference for DI matching was taken from the results of [Galvez-Lopez]. For all three matching strategies, Lowe's ratio test is applied [Lowe]. The threshold was empirically adjusted to 0.75 for the BF matcher and 0.7 for the FLANN-based matcher and the DI matcher. To reject wrongly associated feature matches, the epipolar constraint was evaluated by estimating the essential matrix using the 5-point algorithm in a RANSAC scheme (5DOF) 918 and the rotational consistency check (ROT) 922.

Figure 13:
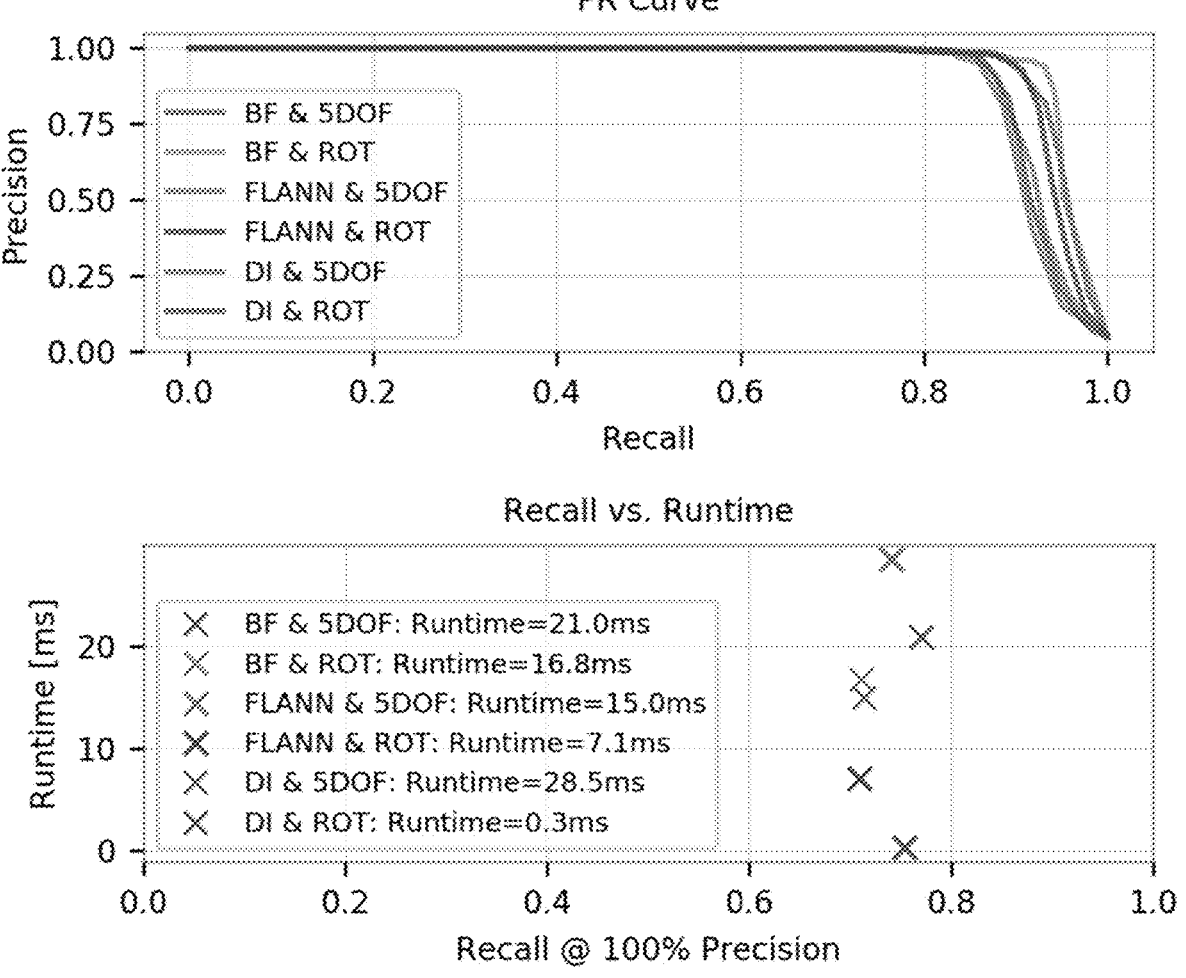
FIG. 13 illustrates the precision recall curve of different feature matching and rejection models as well as the performance runtime trade-off in accordance with one or more embodiments of the invention.

To evaluate the best geometrical consistency checker configuration, 1000 overlapping and 19000 non-overlapping images were tested from the simulation. The final number of inlier feature matches was used to calculate the precision-recall (PR) curve. FIG. 13 illustrates the precision recall curve of different feature matching and rejection models as well as the performance runtime trade-off in accordance with one or more embodiments of the invention. More specifically, the top plot in FIG. 13 shows the PR curve for all matching and rejection combinations. Recall at 100% precision is of particular interest since it corresponds to the inlier threshold that maximized the number of detected loop closures without any false positives.

The bottom curve of FIG. 13 illustrates the performance-runtime tradeoff. Performance differences are primarily defined by runtime differences and not recall rates. The best performance is achieved by the BF+5DOF combination. The DI+ROT combination achieves the second-best performance but at sub-millisecond runtime, which allows the overall system to perform multiple geometrical consistency checks, increasing performance. Embodiments of the invention utilize the DI+ROT combination for its runtime-performance trade-off.

System Evaluation

Three (3) data sources were used for the system evaluation: simulated flights, UAS flights, and Ingenuity flights.

Figure 14:
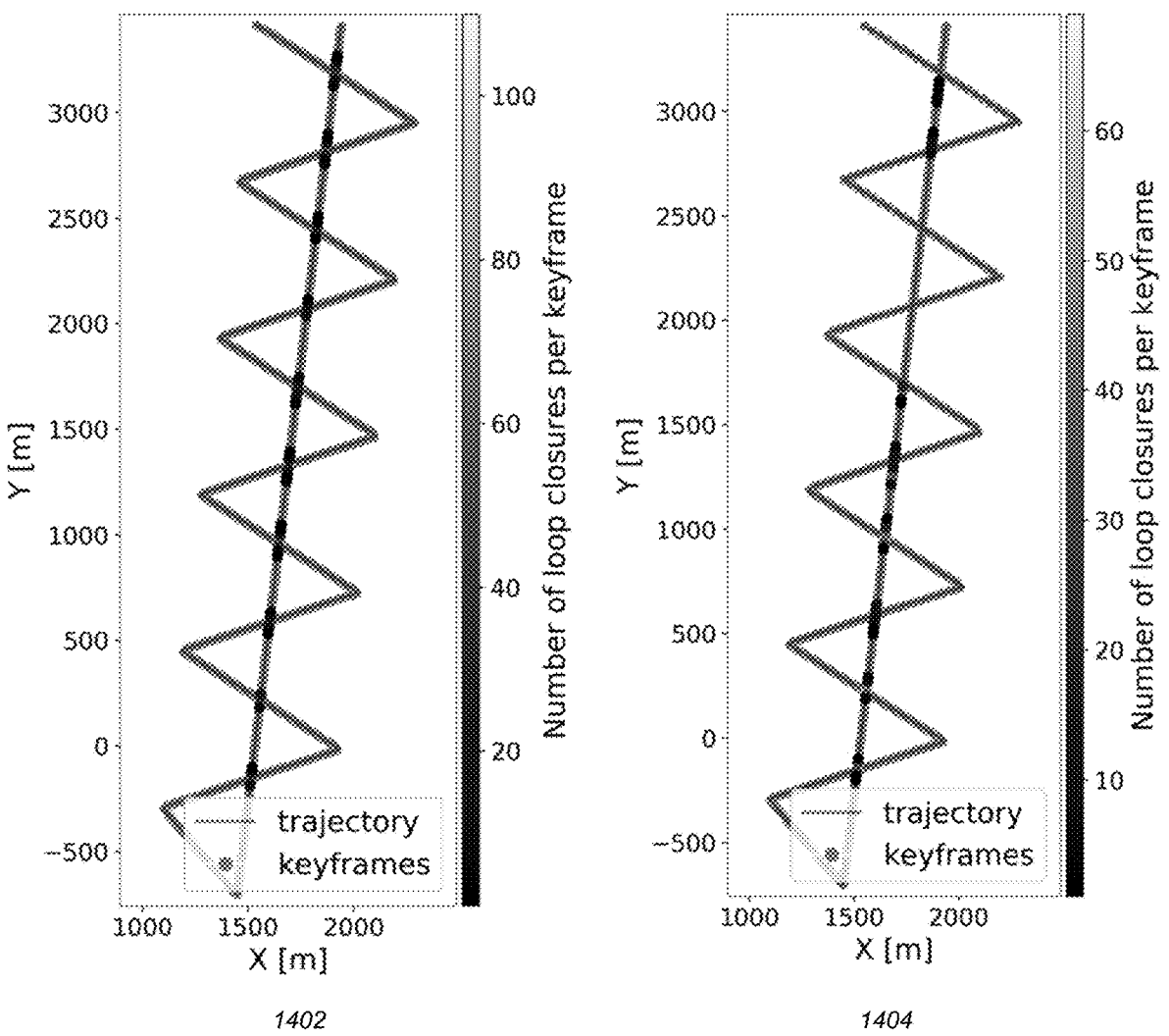
FIG. 14 visualizes the detected loop closures for zigzag EASY and zigzag HARD in accordance with one or more embodiments of the invention.

In simulation, zigzag flights were generated, where the helicopter flies out on a straight line and returns in a zigzag pattern. The system was evaluated on two flights, an EASY flight on 100 m AGL with pure translation in x and y direction and a HARD flight with random pitch and roll movements within ±8 degrees, an increasing full 360 degrees turn around the z-axis on the zigzag part of the flight and an increasing altitude from 100 m to 200 m AGL also starting on the zigzag part. On the EASY flight, 1643 loop closures are detected, while 430 are missed. On the HARD flight, 1053 loop closures are detected, and 722 are missed. On both flights, there were no false positives. FIG. 14 visualizes the detected loop closures for zigzag EASY 1402 and zigzag HARD 1404 in accordance with one or more embodiments of the invention.

Figure 15:
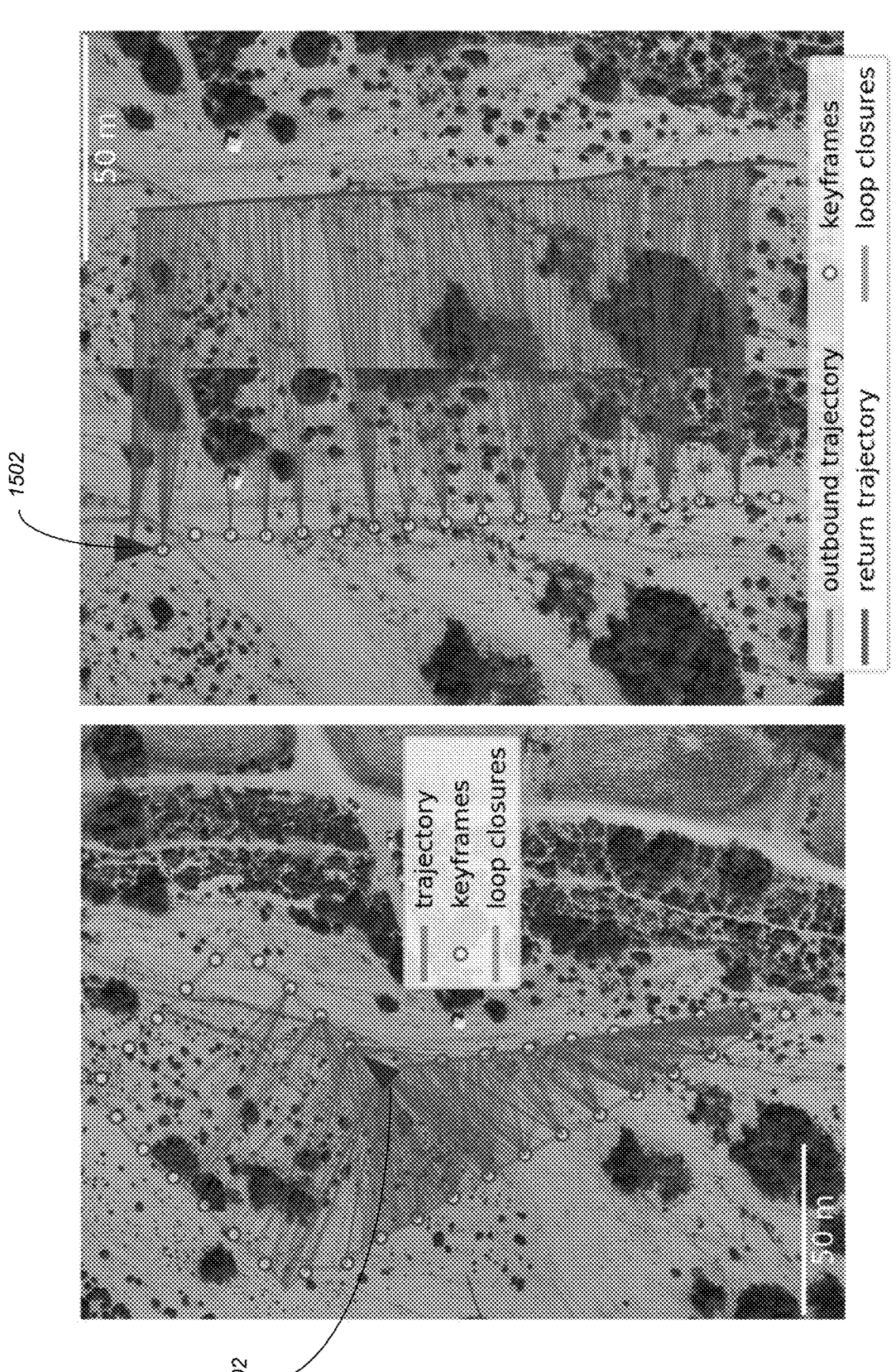
FIG. 15 illustrates detected loop closures for flights in accordance with one or more embodiments of the invention.

The second data source consists of two flights recorded on a UAS. The drone used for these flights was equipped with the same navigation camera as a future MSH. It additionally carried an RTK-GPS (real-time kinematic positioning for global positioning system) for ground truth position. The first flight followed a circular path on 50 m AGL and the second flight was a return-home flight, meaning the outbound and return trajectory overlap on 30 m AGL. The detected loop closures for both flights are shown in FIG. 15. More specifically, FIG. 9 illustrates loop closures detected on UAS flight 1 (left) and UUAS flight 2 (right) in accordance with one or more embodiments of the invention. The start position is indicated by triangle 1502. In the first flight, only the start and end positions coincide. All the remaining loop closure pairs have partial overlap. Fewer loop closures are detected in the top part of the flight due to larger distances between the loop closure pairs as compared to the pairs on the bottom part. Note that the system ignores recent keyframes unless there was a change in direction of more than 90 degrees. The corner at the top of the image does not fulfill that condition. Thus, there are no loop closures between frames right before and after the corner. The system consistently detects loop closures throughout the second flight. The recall and precision rate are shown in Table 3. In other words, Table 3 illustrates a performance comparison of a system of embodiments of the invention on different datasets. On both flights, no false positives were detected.

TABLE 3

|  | Recall [%] | Precision [%] | TP | FP | FN |
| --- | --- | --- | --- | --- | --- |
| Ingenuity | 41.3 | 100 | 131 | 0 | 186 |
| UAS flight 1 | 53.1 | 100 | 1156 | 0 | 1021 |
| UAS flight 2 | 77.3 | 100 | 856 | 0 | 252 |
| Zigzag EASY | 79.3 | 100 | 1643 | 0 | 430 |
| Zigzag HARD | 59.3 | 100 | 1053 | 0 | 722 |

Finally, the system was evaluated on flight data from Ingenuity. To that end, flights 7 to 19 were stitched together, removing the landing and take-off sequences to form a single flight. This flight covers a distance of 3276 m at altitudes ranging from 7.2 m to 13.4 m AGL. The database of the proposed system holds 882 keyframes by the end of the flight.

Figure 16:
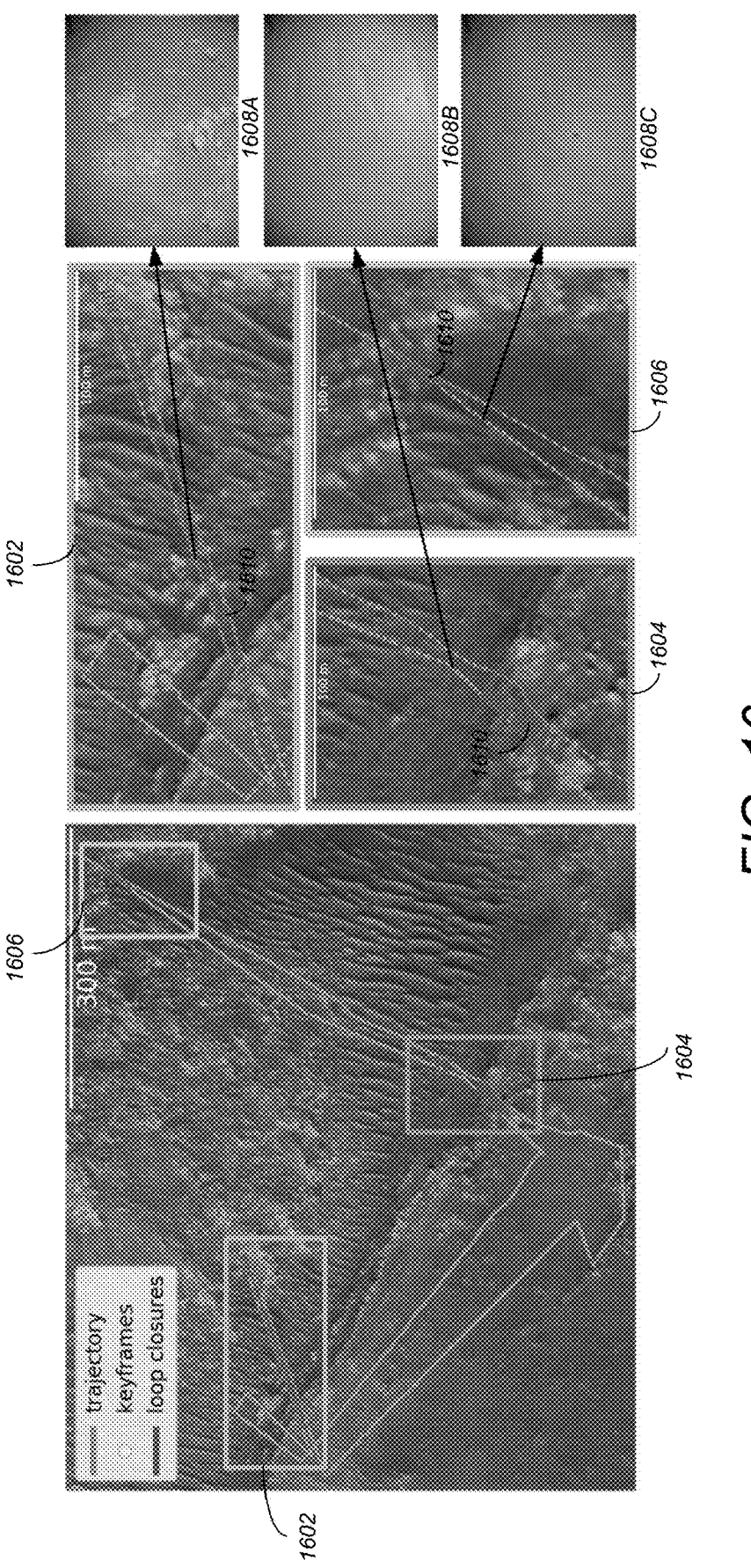
FIG. 16 illustrates detected loop closures on the Ingenuity flight in accordance with one or more embodiments of the invention.

The detected loop closures on the Ingenuity flight are shown in FIG. 16. In particular, detected loop closures 1610 are based on Ingenuity data. Loop closures are detected if sufficient texture is visible in the navigation image. Conversely, the main reason for undetected loop closures is a lack of texture. There are three regions with overlap, as indicated by rectangles 1602, 1604, and 1606. In rectangle 1602, the system detects 51 out of the 70 possible loop closures, which equals a recall rate of 72.9%. In rectangles 1604 and 1606, the system's performance is worse, with a recall rate of 31.9% and 30.5%, respectively. The overall recall rate is 41.3%, as shown in Table 3. There are multiple reasons for these performance differences. First, the terrain in rectangle 1602 area has more texture. Thus, the extracted features are more distinctive, which increases the chances of corresponding features being assigned to the same word. The three navigation images 1608A-1608C show the differences in texture. Secondly, the loop closure image pairs in rectangle 1602 have been taken only minutes apart since they are part of the same flight. Whereas the loop closure pairs in rectangles 1604 and 1606 were taken approximately 5 and 7 months apart. Additionally, there was a sand storm right before the most recent flight in rectangle 1606. And lastly, the loop closure pairs in rectangle 1602 have more overlap.

Runtime Evaluation

Figure 17:
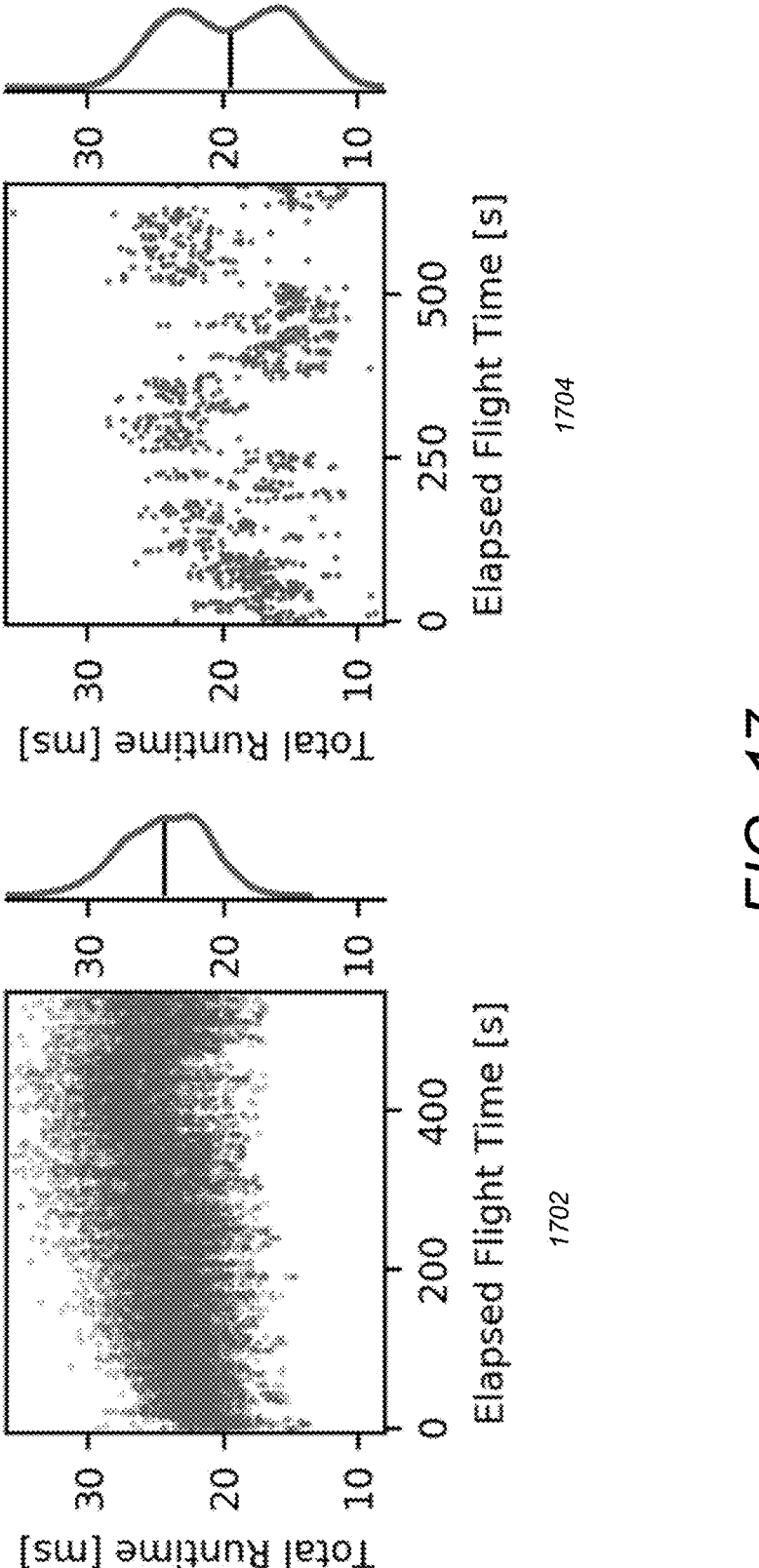
FIG. 17 illustrates the total runtime for the HARD zigzag flight and for the Ingenuity flight in accordance with one or more embodiments of the invention.

FIG. 17 illustrates the total runtime with chart 1702 reflecting the total runtime for the HARD zigzag flight and chart 1704 illustrating the total runtime for the Ingenuity flight in accordance with one or more embodiments of the invention. More specifically, FIG. 17 shows the runtime required run an incoming navigation image through the entire processing pipeline. The results show that total runtime is well below the 33.3 ms mark required to run at the 30 Hz framerate for both the simulated and the Ingenuity flight. The mean runtime on the simulated dataset is 24.3 ms, and on the Ingenuity flight, it is 19.4 ms. The runtime is smaller on the Ingenuity flight since the Martian terrain has on average less texture than the simulated terrain. The runtime evaluation was performed on a single thread of a mid-range Desktop CPU, an AMD Ryzen 5 2600. In terms of single thread performance, the Ryzen and Snapdragon 820 CPUs are comparable, with Ryzen having a rating of 2250, while the Snapdragon has a rating of 19653. Given the small difference in single-thread performance, one can expect that embodiments of the invention will run at or close to the 30 Hz framerate of the navigation camera of MSH.

System Limitations

Embodiments of the invention may have limitations in terms of minimum image overlap and altitude difference. Knowing the conditions that have to be met for robust loop detection may be useful for mission design if the mission success depends on the information that the loop closures provide.

To evaluate the minimum overlap required, images were recorded from simulated flights consisting of a straight out-bound and return trajectory covering a total distance of approximately 2 km at a fixed altitude of 100 m AGL. Image overlap was controlled by varying the horizontal distance between the flight paths. In total, 11 flights with 0 to 100% image overlap in 10% increments were recorded. Results indicate that for overlaps below 65% the system will no longer reliably detect loop closures.

The second limitation is altitude differences. These flights also consist of a straight outbound and return trajectory covering 2 km, but instead of changing the horizontal offset, the vertical offset of the lines was changed. The outbound trajectory was on 100 m AGL, and the return trajectory varied from 40 to 200 m AGL in 10 m increments, resulting in 17 flights. The results show that good performance can be expected if the ratio stays between 60% and 150%.

Conclusions

Embodiments of the invention provide a vision-based loop closure detection system that finds image-to-image correspondences between the on-board navigation camera and previously seen keyframes. Embodiments may use a BoW-based approach with a custom Mars-optimized vocabulary together with an efficient geometrical consistency check to remove false loop closures. It can be shown that such a system is capable of detecting loop closures on Mars data collected by the Ingenuity helicopter while being efficient enough to run in real-time on the computationally constrained platform of a future Mars helicopter.

Additional embodiments may also resolve the scale ambiguity of the estimated essential matrix and more tightly integrate the on-board pose estimator (xVIO) to update state estimates with loop closure results.

Methodology

Figure 18:
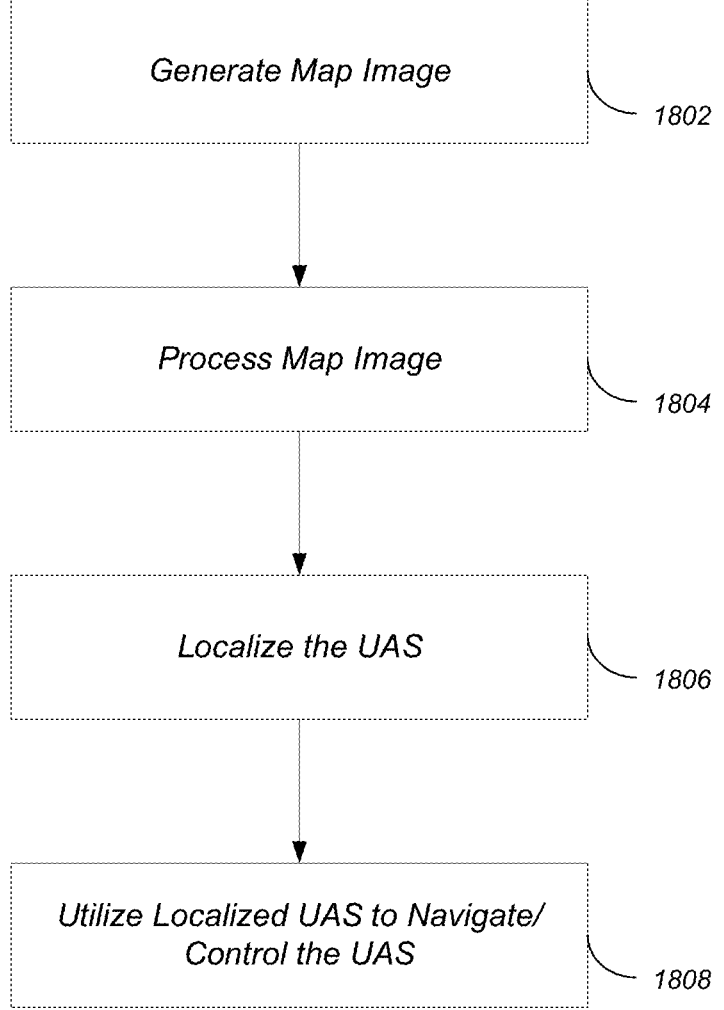
FIG. 18 illustrates the logical flow/methodology for localized the UAS in accordance with one or more embodiments of the invention.

Embodiments of the invention provide a method and system to localize an unmanned aerial vehicle in an absolute world coordinate system based on images taken by an on-board camera and a reference image map. FIG. 18 illustrates the logical flow/methodology for localized the UAS in accordance with one or more embodiments of the invention.

At step 1802, a map image of an area that the UAS is overflying is generated (using previously acquired images). Such previously acquired images can be aerial or orbital images. More specifically, the previously acquired images may be available orbital image maps (e.g., GOOGLE MAPS on earth or HiRISE or CTX on Mars), images from a previous flight of a different aerial platform, or images from a previous flight of the same aerial platform.

In one or more embodiments, the previously acquired images are collected via an aerial or orbital vehicle, and processed prior to the flight of the UAS. For example, images from different sensors such as radar, thermal infrared, etc. may be collected.

In one or more embodiments, the previously acquired images are collected during a previous flight of the same UAS and processed offline into the map image.

In one or more additional embodiments, the previously acquired images are acquired by the same UAS during the same flight, and processed on-board the UAS into the map image. Such a variation essentially follows a bread-crumb approach of localizing to a previous flight path. For example, the UAS may fly back to the take-off position during an exploration mission. For example, on Mars, the UAS may fly into a carter where the UAS cannot land, and then come back the same path to land at the safe take-off location. In such embodiments, map sizes may be limited due to on-board processing capabilities.

At step 1804, the map image is processed. Such processing includes: (i) orthorectifying the map image; (ii) referencing the map image in a global reference frame by mapping pixel coordinates in the map image to the global reference frame; and (iii) generating an abstract map.

The orthorectification of the map image warps the map images such that the image plane is perpendicular to the gravity vector and then merges the map images together into a mosaic. Such a processing may include some image processing to normalize brightness, enhance contrast, reduce noise, etc.

The single image or merged image mosaic is referenced in the global reference frame. For example, pixel GPS coordinates may be recorded on Earth and/or pixel locations may be references based on existing HiRISE/CTX maps on Mars. A digital elevation map may be used to provide an elevation reference mapping for each pixel. This can be from HiRISE/CTX digital elevation maps (DEMs) on Mars, available DEMs on Earth, and/or elevation maps based on image-based 3D reconstruction (off-line by a batch optimization process or on-line (on the vehicle) by structure from motion processing. The result of referencing the single image in the global reference frame is a mapping of pixel coordinates in the map image to the global reference frame (2D to 3D mapping).

The abstract map is generated by processing the map image. Specifically, feature detection is performed to enforce a local minimum density (e.g., a local density that exceeds a threshold minimum value). The features in the abstract map are then located within the global reference frame and assigned a 3D position in the global reference frame.

At step 1806, the UAS is localized. The localization process first includes acquiring camera images during flight by an on-board camera of the UAS. Localization images are then selected from the camera images via a triage process (e.g., keyframe image selection that may be based on predicted feature density or image overlap). On-board image features are then detected in the selected localization images. If an on-board estimated pose of the UAS is available, it is used as a pose prior to predict where a feature appears in the map image using the pose prior covariance plus a margin, to restrict the search range for matching in the global reference frame.

The localization continues and performs feature mapping from the detected on-board image features to map image. Thereafter, matching outliers are deleted using a RANSAC perspective-n-points approach to simultaneously calculate an estimate of the 3D pose of the UAS in the global reference frame. A variant could deploy a least squares algorithm with a convex loss function to estimate the 3D position and then calculate the re-projection error of each image feature with respect to the matched map feature to identify outliers.

The localization then refines the 3D pose of the UAS as an absolute pose of the UAS in the global reference frame.

In one or more embodiments, all of the localization images may not be processed into the abstract map. Instead, the localization images may be triaged where keyframes/keyframe images are identified (during the selection process) and stored in a database on-board the UAS, referenced with the pose of the vehicle when the keyframe image was taken. A place recognition algorithm may then be utilized to determine an association between a current image from the localization images with one of the keyframe images in the database (place recognition). Once the keyframe images from the database are matched to the localization image, the same PnP algorithm may be used to calculate a 3D pose of the UAS with respect to a previously recorded pose of the UAS when the keyframe image was taken. A loop-closure algorithm may then be used to improve the accuracy of the 3D pose (i.e., map image poses) by using the association of the localization image (with a keyframe image in the database) to optimize all camera poses from the map image and the localization images (batch optimization). Map images may be from a previous flight, map processing (triage and database storage) may be done on-board (e.g., when the vehicle is landed) or off-board and then uploaded to the vehicle (e.g., onto a Mars Science Helicopter)

In view of the above, embodiments may provide the map images are processed into a map on-board and on-line while a flight takes place (during the same flight). Such embodiments would allow exploration of unknown terrain and safe landing at a take-off location. In additional embodiments, processing similar to the above may be performed but in an enclosed structure (e.g., cave exploration, underground structure exploration, etc.).

At step 1808, the localized UAS is utilized to autonomously navigate/control the UAS.

Improvements to the above steps may include incorporation of the localization results into an on-board estimator (i.e., of the UAS) (i.e., during the localizing step). For example, results of the localizing may be fed back into an on-board state estimator to directly eliminate drift and reduce error of on-board state estimates continuously (i.e., in a continuous fashion) in real-time to improve accuracy of UAS navigation/control. Such embodiments may also introduce/use an odometry frame for on-board estimated poses (that may have jumps due to the absolute localization corrections). Further, such embodiments may introduce/use a control frame (that has no correction and is used for control) to avoid specified/large position deltas in inputs to a controller of the UAS (e.g., to avoid position deltas that exceed a threshold).

Additional embodiments of the invention may cope with a changing environment/resolution between a time the map image was taken and a time the localization images were acquired on-board. In other words, embodiments cope with significant changes in a resolution of the map image vs. the localization image. To cope with such resolution issues, a multi-resolution matching approach may be deployed that incorporates feature mapping at multiple image pyramid levels in the map image and in the localization images.

Additional embodiments of the invention may cope with a changing environment/illumination between a time the map image was taken and a time the localization images were acquired on-board. In this regard, changing illumination over 3D terrain is challenging for feature matching approaches, since changing shadows alter the appearance of the terrain within the image. To cope with such changing illumination, embodiments may extend the map image with images taken of a same location at a different time of day to produce features with descriptors that can be used to match the localization images within a larger range of illumination compared to the non-extended map image. Further, machine learning may be used to learn feature detectors and descriptors that are agnostic to illumination and scale changes.

Additionally, the digital elevation map (DEM) may be used to render virtual shadows on the terrain for different times of day and use the rendered (virtual) shadows to alter the brightness of pixels in the map ortho-image/map image in order to derive descriptors that are adapted to the simulated illumination regime at the different times of day.

Further embodiments of the invention may cope with a changing environment/partial obstruction tolerance (e.g., caused by clouds) between a time the map image was taken and a time the localization images were acquired on-board. To cope with such a partial obstruction tolerance, embodiments may process the image map to identify areas of feature distribution that are below a defined distribution threshold (e.g., poor feature distribution) or false feature appearance due to introduced artificial texture (e.g., by clouds in orbital and high-altitude aerial imagery. The map processing will identify where valid terrain features are present within an image map. For example, temporal integration may be used to identify areas of change within the map image and invalidate such areas. Thereafter, the UAS may adapt its motion plan to avoid areas with map feature density below a density threshold (i.e., low map feature density) or areas with map coverage below a coverage threshold (e.g., poor map coverage).

Machine Learning

Figure 19A:
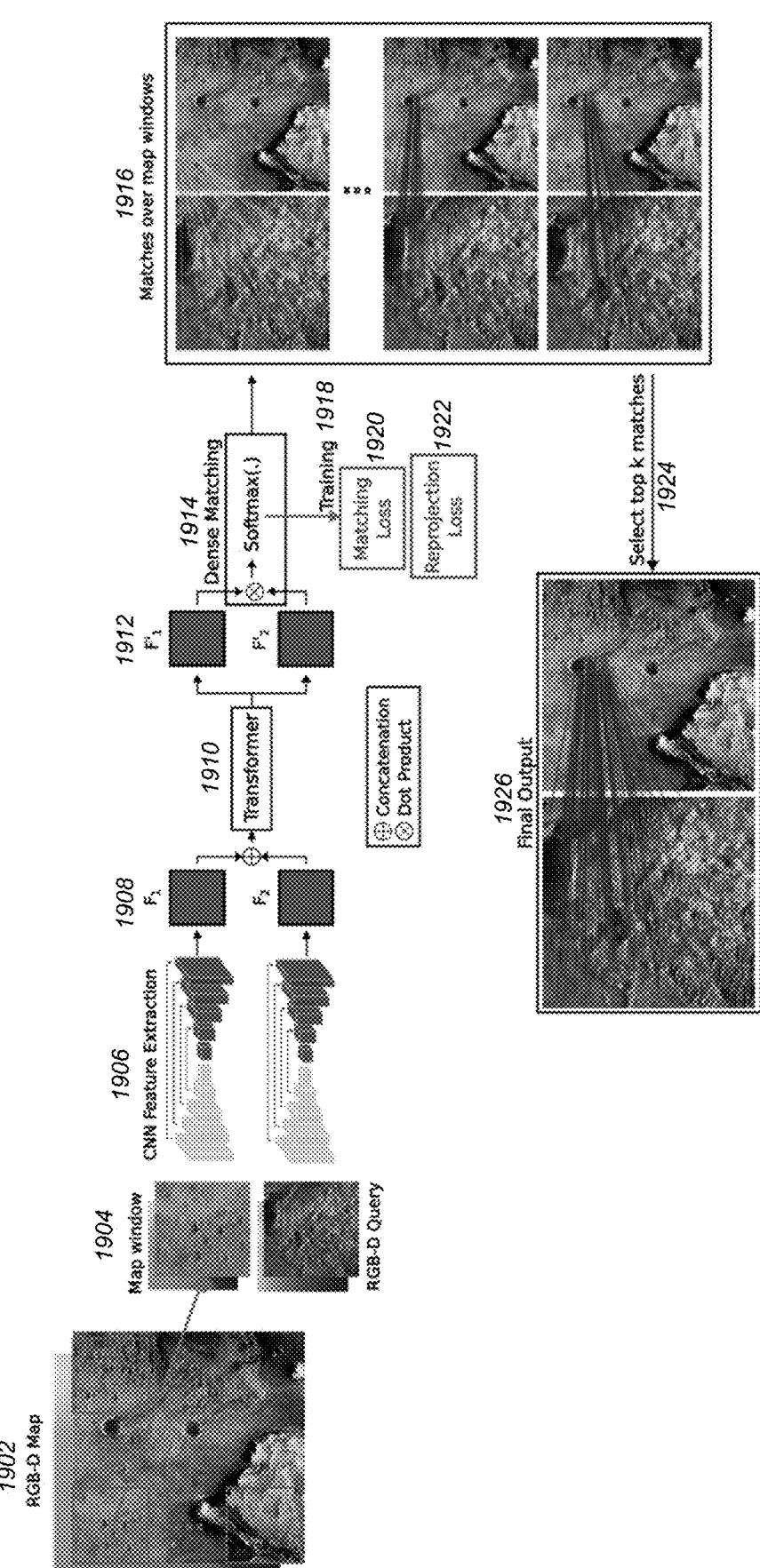
FIGS. 19A and 19B illustrate learned feature mapping in the map matching process for the Jezero crater (FIG. 19A) and the Canyon (FIG. 19B) in accordance with one or more embodiments of the invention.
Figure 19B:
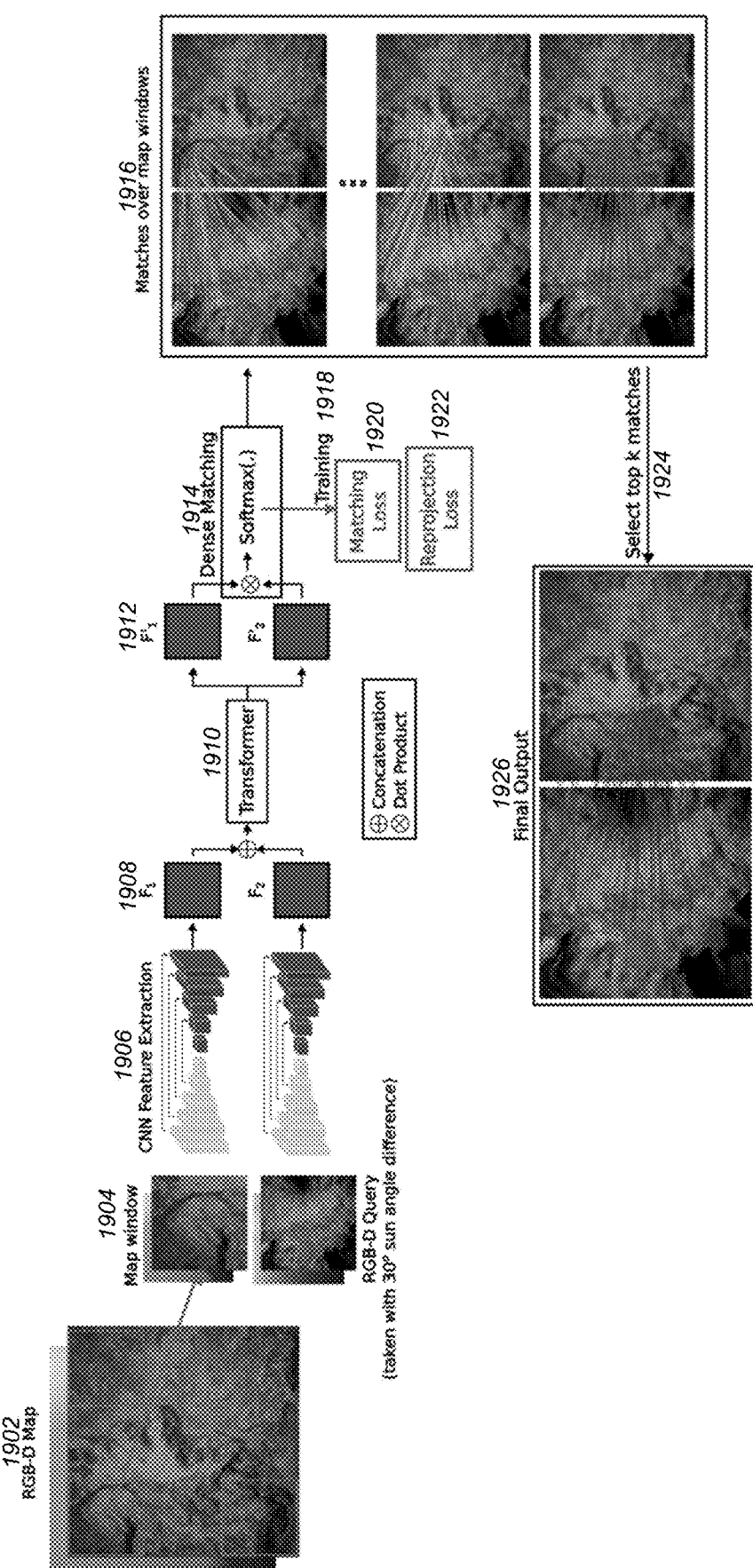

Embodiments of the invention may also provide a machine learning architecture for map-based Localization. FIGS. 19A and 19B illustrate learned feature mapping in the map matching process for the Jezero crater (FIG. 19A) and the Canyon (FIG. 19B) in accordance with one or more embodiments of the invention.

Given a (RGB-D) map 1902, a sliding window 1904 is used to crop parts of the map and match them to an observation from the drone/UAS. The observation is often captured at a different time of day from the map where the sun angle difference creates a visual appearance gap between the map and observation. Input consists of 4 channels that includes RGB and depth information. For each input, embodiments first extract 1906 pixel-wise deep features ($F_n$ 1908) using a typical backbone architecture (e.g. FPN [Lin]) and then embodiments concatenate and pass those features through a Transformer 1910 [Vaswani] network. The Transformer 1910 learns to associate information between pixels of the same input and the pixels between inputs (i.e., to generate $F'_n$ 1912). Finally, the feature representations 1912 are densely matched 1914 to produce a set of correspondences (i.e., matches over map windows 1916). During training 1918, the matches can be compared to ground-truth correspondences either in the form of a classification task (Matching Loss 1920) or by measuring the reprojection error between the matches (Reprojection Loss 1922) (thereby autonomously updating the model used to perform the matching). In the inference stage, embodiments collect all matches 1916 across the individual map crops and select 1924 the top K matches to produce the final output 1926. The final output 1926 may further be used to update the model as part of the training 1918.

Computer/Hardware Components

Figure 20:
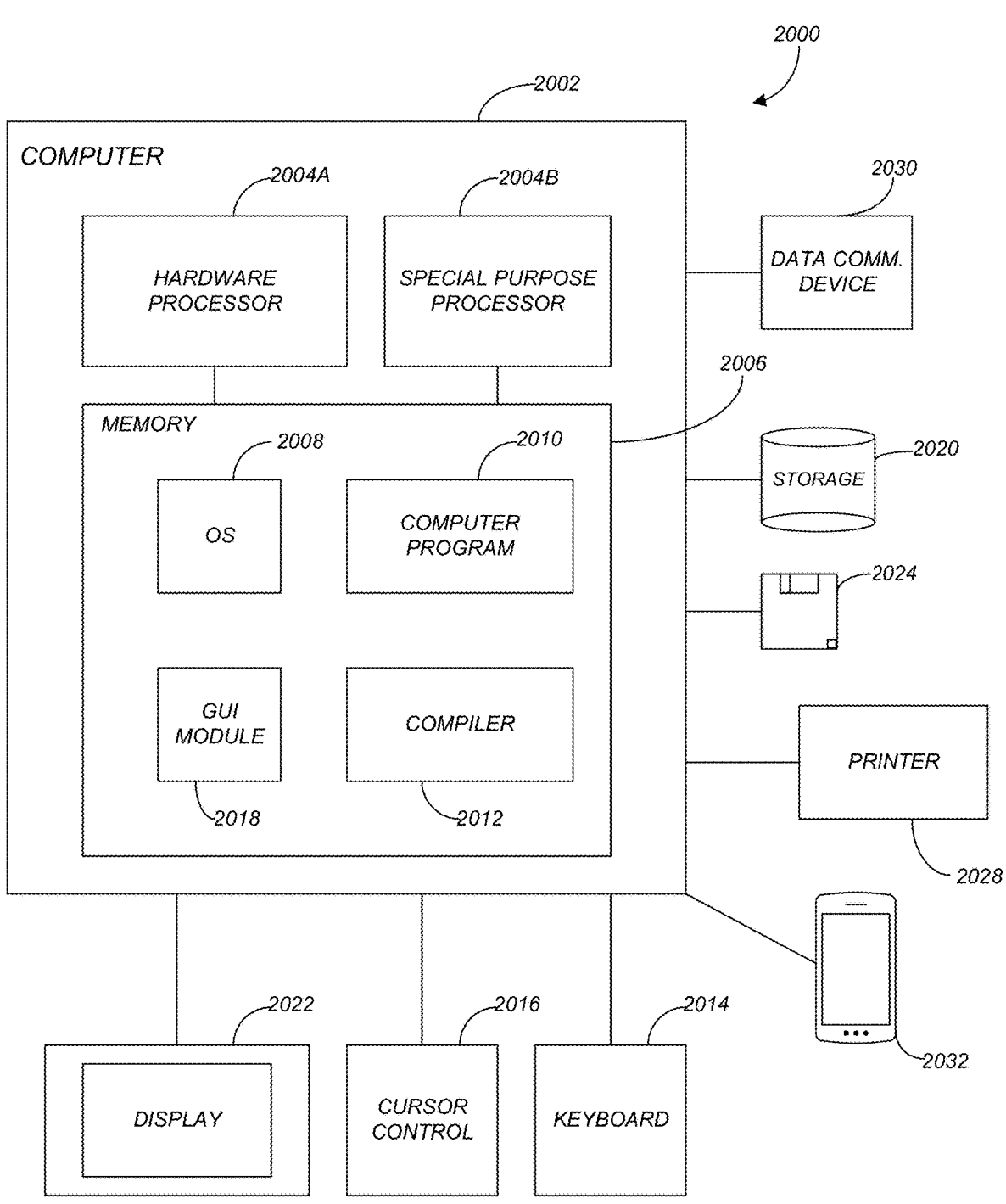
FIG. 20 is an exemplary hardware and software environment in accordance with one or more embodiments of the invention.

Embodiments of the invention may utilize/include a computer/hardware components that communicates with a UAS and/or is integrated into a UAS. FIG. 20 is an exemplary hardware and software environment 2000 (referred to as a computer-implemented0 system and/or computer-implemented method) used to implement such a computer/hardware components. The hardware and software environment includes a computer 2002 and may include peripherals. Computer 2002 may be a user/client computer, server computer, or may be a database computer. The computer 2002 comprises a hardware processor 2004A and/or a special purpose hardware processor 2004B (hereinafter alternatively collectively referred to as processor 2004) and a memory 2006, such as random access memory (RAM). The computer 2002 may be coupled to, and/or integrated with, other devices, including input/output (I/O) devices such as a keyboard 2014, a cursor control device 2016 (e.g., a mouse, a pointing device, pen and tablet, touch screen, multi-touch device, etc.) and a printer 2028. In one or more embodiments, computer 2002 may be coupled to, or may comprise, a portable or media viewing/listening device 2032 (e.g., an MP3 player, IPOD, NOOK, portable digital video player, cellular device, personal digital assistant, etc.). In yet another embodiment, the computer 2002 may comprise a multi-touch device, mobile phone, gaming system, internet enabled television, television set top box, or other internet enabled device executing on various platforms and operating systems.

In one embodiment, the computer 2002 operates by the hardware processor 2004A performing instructions defined by the computer program 2010 (e.g., a computer-aided design [CAD] application) under control of an operating system 2008. The computer program 2010 and/or the operating system 2008 may be stored in the memory 2006 and may interface with the user and/or other devices to accept input and commands and, based on such input and commands and the instructions defined by the computer program 2010 and operating system 2008, to provide output and results.

Output/results may be presented on the display 2022 or provided to another device for presentation or further processing or action. In one embodiment, the display 2022 comprises a liquid crystal display (LCD) having a plurality of separately addressable liquid crystals. Alternatively, the display 2022 may comprise a light emitting diode (LED) display having clusters of red, green and blue diodes driven together to form full-color pixels. Each liquid crystal or pixel of the display 2022 changes to an opaque or translucent state to form a part of the image on the display in response to the data or information generated by the processor 2004 from the application of the instructions of the computer program 2010 and/or operating system 2008 to the input and commands. The image may be provided through a graphical user interface (GUI) module 2018. Although the GUI module 2018 is depicted as a separate module, the instructions performing the GUI functions can be resident or distributed in the operating system 2008, the computer program 2010, or implemented with special purpose memory and processors.

In one or more embodiments, the display 2022 is integrated with/into the computer 2002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 2002 according to the computer program 2010 instructions may be implemented in a special purpose processor 2004B. In this embodiment, some or all of the computer program 2010 instructions may be implemented via firmware instructions stored in a read only memory (ROM), a programmable read only memory (PROM) or flash memory within the special purpose processor 2004B or in memory 2006. The special purpose processor 2004B may also be hardwired through circuit design to perform some or all of the operations to implement the present invention. Further, the special purpose processor 2004B may be a hybrid processor, which includes dedicated circuitry for performing a subset of functions, and other circuits for performing more general functions such as responding to computer program 2010 instructions. In one embodiment, the special purpose processor 2004B is an application specific integrated circuit (ASIC).

The computer 2002 may also implement a compiler 2012 that allows an application or computer program 2010 written in a programming language such as C, C++, Assembly, SQL, PYTHON, PROLOG, MATLAB, RUBY, RAILS, HASKELL, or other language to be translated into processor 2004 readable code. Alternatively, the compiler 2012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2010 accesses and manipulates data accepted from I/O devices and stored in the memory 2006 of the computer 2002 using the relationships and logic that were generated using the compiler 2012.

The computer 2002 also optionally comprises an external communication device such as a modem, satellite link, Ethernet card, or other device for accepting input from, and providing output to, other computers 2002 and/or the UAS.

In one embodiment, instructions implementing the operating system 2008, the computer program 2010, and the compiler 2012 are tangibly embodied in a non-transitory computer-readable medium, e.g., data storage device 2020, which could include one or more fixed or removable data storage devices, such as a zip drive, floppy disc drive 2024, hard drive, CD-ROM drive, tape drive, etc. Further, the operating system 2008 and the computer program 2010 are comprised of computer program 2010 instructions which, when accessed, read and executed by the computer 2002, cause the computer 2002 to perform the steps necessary to implement and/or use the present invention or to load the program of instructions into a memory 2006, thus creating a special purpose data structure causing the computer 2002 to operate as a specially programmed computer executing the method steps described herein. Computer program 2010 and/or operating instructions may also be tangibly embodied in memory 2006 and/or data communications devices 2030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2002.

Figure 21:
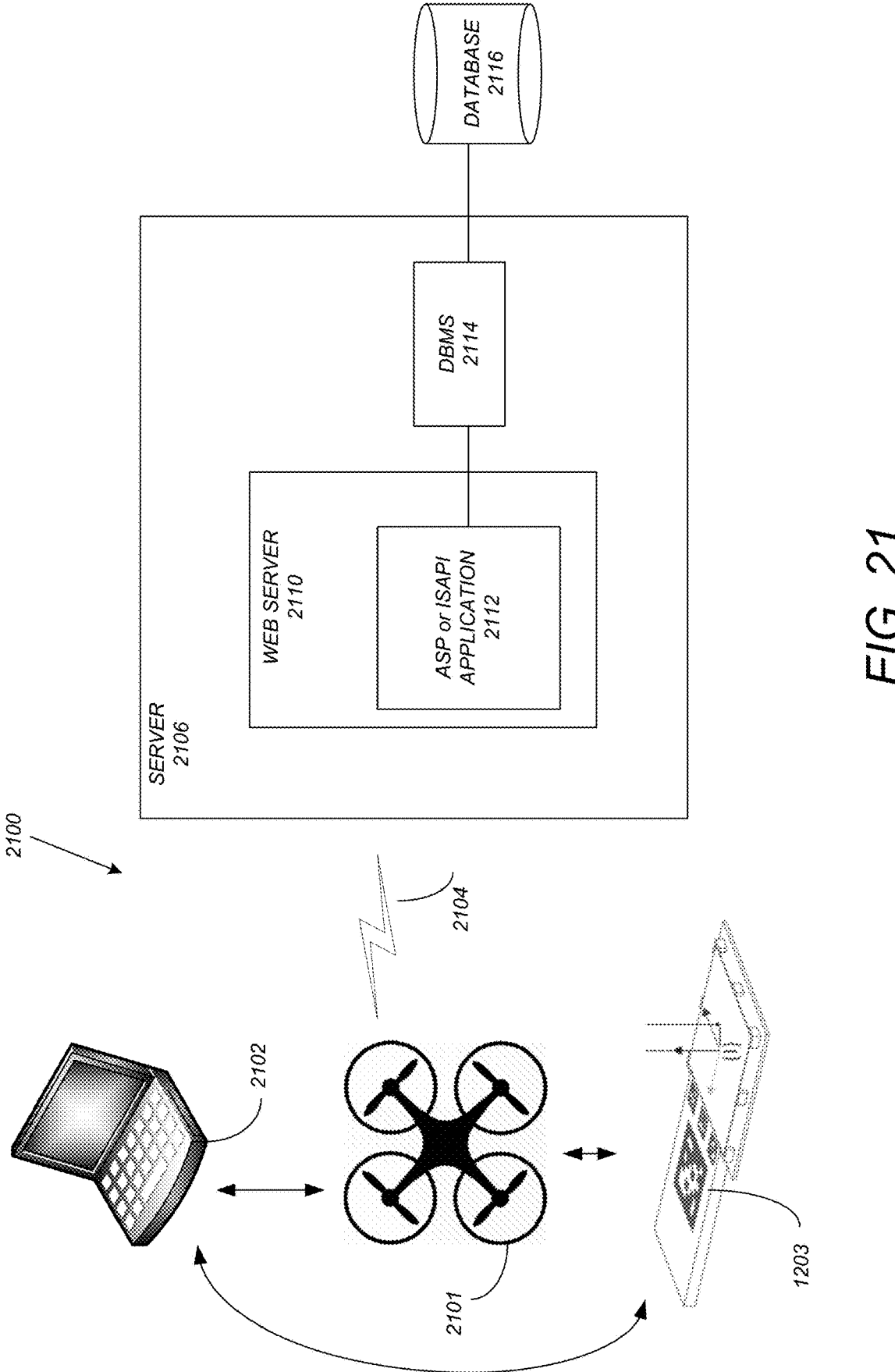
FIG. 21 schematically illustrates a typical distributed/cloud-based computer system 2100 and UAS in accordance with one or more embodiments of the invention.

FIG. 21 schematically illustrates a typical distributed/cloud-based computer system 2100 using a network 2104 to connect client computers 2102 (which may be laptop computer, desktop computers, etc.), UAS 2101, and/or landing/charging stations 2103 to server computers 2106 and/or to each other. A typical combination of resources may include a network 2104 comprising the Internet, LANs (local area networks), WANs (wide area networks), SNA (systems network architecture) networks, or the like, clients 2102 that are personal computers, workstations, and/or are integrated into landing-charging stations 1203, and servers 2106 that are personal computers, workstations, minicomputers, or mainframes (as set forth in FIG. 20). However, it may be noted that different networks such as a cellular network (e.g., GSM [global system for mobile communications] or otherwise), a satellite based network, or any other type of network may be used to connect clients 2102 and servers 2106 in accordance with embodiments of the invention.

A network 2104 such as the Internet connects clients 2102 to server computers 2106. Network 2104 may utilize ethernet, coaxial cable, wireless communications, radio frequency (RF), etc. to connect and provide the communication between clients 2102 and servers 2106. Further, in a cloud-based computing system, resources (e.g., storage, processors, applications, memory, infrastructure, etc.) in clients 2102 and server computers 2106 may be shared by clients 2102, server computers 2106, and users across one or more networks. Resources may be shared by multiple users and can be dynamically reallocated per demand. In this regard, cloud computing may be referred to as a model for enabling access to a shared pool of configurable computing resources.

Clients 2102 may execute a client application or web browser and communicate with server computers 2106 executing web servers 2110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2102 may be downloaded from server computer 2106 to client computers 2102 and installed as a plug-in or ACTIVEX control of a web browser. Accordingly, clients 2102 may utilize ACTIVEX components/component object model (COM) or distributed COM (DCOM) components to provide a user interface on a display of client 2102. The web server 2110 is typically a program such as MICROSOFT'S INTERNET INFORMATION SERVER.

Web server 2110 may host an Active Server Page (ASP) or Internet Server Application Programming Interface (ISAPI) application 2112, which may be executing scripts. The scripts invoke objects that execute business logic (referred to as business objects). The business objects then manipulate data in database 2116 through a database management system (DBMS) 2114. Alternatively, database 2116 may be part of, or connected directly to, client 2102 instead of communicating/obtaining the information from database 2116 across network 2104. When a developer encapsulates the business functionality into objects, the system may be referred to as a component object model (COM) system. Accordingly, the scripts executing on web server 2110 (and/or application 2112) invoke COM objects that implement the business logic. Further, server 2106 may utilize MICROSOFT'S TRANSACTION SERVER (MTS) to access required data stored in database 2116 via an interface such as ADO (Active Data Objects), OLE DB (Object Linking and Embedding DataBase), or ODBC (Open Data-Base Connectivity).

Generally, these components 2100-1816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2102 and 2106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2102 and 2106. Embodiments of the invention are implemented as a software/CAD application on a client 2102 or server computer 2106. Further, as described above, the client 2102 or server computer 2106 may comprise a thin client device or a portable device that has a multi-touch-based display.

Further to the above, embodiments of the invention may consist of the UAS 2101 that may include the computer 2002 including a hardware processor 2004A/special purpose processor 2004B and storage 2020 (that may include the database as described herein) without additional traditional computer components in order to minimize potential hardware/component failures on Mars and/or in locations that are inaccessible. Communication may also be performed via data communication device 2030 to enable communication. Further, UAS 2101 may include a camera, controller, etc. as described herein. In addition, UAS 2101 includes the components necessary to conduct the processing (e.g., on-board processing) described in all of the other figures include FIG. 1, FIG. 2, FIG. 9, FIG. 18, and FIGS. 19A-19B. The hardware components in FIGS. 20 and 21 may also be used to perform the processing that are not conducted on-board.

Conclusion

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bapst] J. Bapst, T. J. Parker, J. Balaram, T. Tzanetos, L. H. Matthies, C. D. Edwards, A. Freeman, S. WithrowMaser, W. Johnson, E. Amador-French, J. L. Bishop, I. J. Daubar, C. M. Dundas, A. A. Fraeman, C. W. Hamilton, C. Hardgrove, B. Horgan, C. W. Leung, Y. Lin, A. Mittelholz, and B. P. Weiss, "Mars science helicopter: Compelling science enabled by an aerial platform," in *Planetary Science and Astrobiology Decadal Survey 2023-2032*, 2021.

[Rapin] W. Rapin, A. Fraeman, B. L. Ehlmann, A. Mittelholz, B. Langlais, R. Lillis, V. Sautter, D. Baratoux, V. Payre, A. Udry, B. Horgan, J. Flahaut, G. Dromart,' C. Quantin-Nataf, N. Mangold, S. Maurice, J. T. Keane, and J. Bapst, "Critical knowledge gaps in the Martian geological record: A rationale for regional-scale in situ exploration by rotorcraft mid-air deployment," in *Planetary Science and Astrobiology Decadal Survey 20232032*, 2021.

[Couturier] A. Couturier and M. Akhloufi, "A review on absolute visual localization for uav," *Robotics and Autonomous Systems*, vol. 135, p. 103666, 2021.

[Delaune 1] J. Delaune, G. Le Besnerais, T. Voirin, J. Farges, and C. Bourdarias, "Visual-inertial navigation for pinpoint planetary landing using scale-based landmark matching," *Robotics and Autonomous Systems, vol. 78*, pp. 63-82, 2016.

[Conte] G. Conte and P. Doherty, "Vision-Based Unmanned Aerial Vehicle Navigation Using Geo-Referenced Information," *EURASIP Journal on Advances in Signal Processing*, 2009.

[Yol] A. Yol, B. Delabarre, A. Dame, J.-E. Dartois, and E. Marchand, "Vision-based Absolute Localization for Unmanned Aerial Vehicles," in *IEEE/RSJ International Conference on Intelligent Robots and Systems, IROS*, vol. 14, 2014.

[Mourikis 1] A. I. Mourikis and S. I. Roumeliotis, "A multi-state constraint Kalman filter for vision-aided inertial navigation," in *Proceedings of the IEEE International Conference on Robotics and Automation (ICRA)*, 2007, pp. 3565-3572.

[Matthies] L. Matthies, S. Daftry, B. Rothrock, A. Davis, A, Hewitt, E. Sklyanskiy, J. Delaune, A. Schutte, M. Quadrelli, M. Malaska, and J. Yurtsever, "Terrain relative navigation for guided descent on titan," in *2020 IEEE Aerospace Conference*, 2020, pp. 1-16.

[Mourikis 2] A. I. Mourikis, N. Trawny, S. I. Roumeliotis, A. E. Johnson, A. Ansar, and L. Matthies, "Vision-Aided Inertial Navigation for Spacecraft Entry, Descent, and Landing," *IEEE Transactions on Robotics*, vol. 25, no. 2, pp. 264-280, 2009.

[Lowe] D. Lowe, "Distinctive image features from scale invariant keypoints," *International Journal of Computer Vision*, vol. 60, p. 91-110, 2004.

[Pham] B. V. Pham, S. Lacroix, and M. Devy, "Vision-Based Absolute Navigation for Descent and Landing," *Journal of Field Robotics*, vol. 29, no. 4, pp. 627-647, 2012.

[Cheng] Y. Cheng and A. Ansar, "A Landmark Based Position Estimation for Pinpoint Landing on Mars," in *Proceedings of the 2005 IEEE International Conference on Robotics and Automation (ICRA)*, 2005.

[Dusmanu] M. Dusmanu, I. Rocco, T. Pajdla, M. Pollefeys, J. Sivic, A. Torii, and T. Sattler, "D2-net: A trainable cnn for joint description and detection of local features," in *Proceedings of the IEEE/CVF Conference on Computer Vision and Pattern Recognition (CVPR)*, 2019, pp. 8092-8101.

[Detone] D. DeTone, T. Malisiewicz, and A. Rabinovich, "Superpoint: Self-supervised interest point detection and description," in *CVPR 2018 Deep Learning for Visual SLAM Workshop*, 2018.

[Jin] Y. Jin, D. Mishkin, A. Mishchuk, J. Matas, P. Fua, K. M. Yi, and E. Trulls, "Image matching across wide baselines: From paper to practice," *International Journal of Computer Vision*, vol. 129, no. 2, pp. 517-547, 2021.

[Delaune 3] J. Delaune, R. Brockers, D. S. Bayard, H. Dor, A. Hewitt, J. Sawoniewicz, G. Kubiak, T. Tzanetos, L. Matthies, and J. Balaram, "Extended navigation capabilities for a future mars science helicopter concept," in *IEEE Aerospace Conference*, 2020, pp. 1-10.

[Delaune 4] J. Delaune, D. S. Bayard, and R. Brockers, "Range visual-inertial odometry: Scale observability without excitation," *IEEE Robotics Autom. Lett.*, vol. 6, no. 2, pp. 2421-2428, 2021.

[Shah] S. Shah, D. Dey, C. Lovett, and A. Kapoor, "Airsim: High-fidelity visual and physical simulation for autonomous vehicles," in *Field and Service Robotics*, 2017.

[Bay] H. Bay, T. Tuytelaars, and L. Van Gool, "Surf: Speeded up robust features," in *European Conference on Computer Vision (ECCV)*, 2006.

[Rublee] E. Rublee, V. Rabaud, K. K. Konolige, and G. Bradski, "Orb: An efficient alternative to sift or surf," in *International Conference on Computer Vision (ICCV)*, 2011.

[Mikolajczyk] K. Mikolajczyk and C. Schmid, "Scale & affine invariant interest point detectors," *International Journal of Computer Vision*, vol. 60, no. 1, pp. 63-86, 2004.

[Brockers 1] R. Brockers, J. Delaune, P. Proenca, P. Schoppmann, M. Domnik, G. Kubiak, and T. Tzanetos, "Autonomous Safe Landing Site Detection for a Future Mars Science Helicopter," in IEEE Aerospace Conference, vol. 2021—Mar. 3, 2021, pp. 1-8.

[Delaune 4] J. Delaune, D. S. Bayard, and R. Brockers, "xVIO: A Range-Visual-Inertial Odometry Framework," 10 2020.

[Brockers 2] R. Brockers, P. Proenca, J. Delaune, J. Todd, L. Matthies, T. Tzanetos, and J. Balaram, "On-board Absolute Localization Based on Orbital Imagery for a Future Mars Science Helicopter," in IEEE Aerospace Conference, vol. 2022—Mar. 3, 2022.

[Clemente] L. A. Clemente, A. J. Davison, I. D. Reid, J. Neira, and J. D. Tardo's, "Mapping Large Loops with a Single Hand-Held Camera," in Robotics: Science and Systems, 2007.

[Williams] B. Williams, G. Klein, and I. Reid, "Real-Time SLAM Relocalisation," in Proceedings of the IEEE International Conference on Computer Vision, 2007, pp. 1-8.

[Sivic] J. Sivic and A. Zisserman, "Video google: A text retrieval approach to object matching in videos," in Proceedings of the IEEE International Conference on Computer Vision, vol. 2, 2003, pp. 1470-1477.

[Nister] D. Nister and H. Stewénius, "Scalable recognition with a vocabulary tree," in Proceedings of the IEEE Computer Society Conference on Computer Vision and Pattern Recognition, vol. 2, 2006, pp. 2161-2168.

[Jegou] H. Jegou, M. Douze, and C. Schmid, "Hamming embedding and weak geometric consistency for large scale image search," in European Conference on Computer Vision, vol. 5302 LNCS, no. PART 1. Springer Verlag, 10 2008, pp. 304-317.

[Philbin] J. Philbin, O. Chum, M. Isard, J. Sivic, and A. Zisserman, "Lost in quantization: Improving particular object retrieval in large scale image databases," in Proceeding of the IEEE Conference on Computer Vision and Pattern Recognition, 2008.

[Cummins] M. Cummins and P. Newman, "FAB-MAP: Probabilistic localization and mapping in the space of appearance," International Journal of Robotics Research, vol. 27, no. 6, pp. 647-665, 6 2008.

[Calonder] M. Calonder, V. Lepetit, C. Strecha, and P. Fua, "BRIEF: Binary Robust Independent Elementary Features," in European Conference on Computer Vision, vol. 6314. Springer Verlag, 2010 pp. 778-792.

[Gálvez-López] D. Gálvez-López and J. D. Tardós, "Bags of binary words for fast place recognition in image sequences," IEEE Transactions on Robotics, vol. 28, no. 5, pp. 1188-1197, 2012.

[Mur-Artal 1] R. Mur-Artal, J. M. Montiel, and J. D. Tardós, "ORB-SLAM: A Versatile and Accurate Monocular SLAM System," IEEE Transactions on Robotics, vol. 31, no. 5, pp. 1147-1163, 10 2015.

[Mur-Artal 2] R. Mur-Artal and J. D. Tardós, "ORB-SLAM2: An Open-Source SLAM System for Monocular, Stereo, and RGB-D Cameras," IEEE Transactions on Robotics, vol. 33, no. 5, pp. 1255-1262, 10 2017.

[Campos] C. Campos, R. Elvira, J. J. G. Rodríguez, J. M. M. Montiel, and J. D. Tardós, "Orb-slam3: An accurate open-source library for visual, visual-inertial, and multi-map slam," IEEE Transactions on Robotics, vol. 37, no. 6, pp. 1874-1890, 2021.

[Qin] T. Qin, P. Li, and S. Shen, "VINS-Mono: A Robust and Versatile Monocular Visual-Inertial State Estimator," IEEE Transactions on Robotics, vol. 34, no. 4, pp. 1004-1020, 8 2018.

[Sumikura] S. Sumikura, M. Shibuya, and K. Sakurada, "OpenVSLAM: A versatile visual SLAM framework," MINI 2019—Proceedings of the 27th ACM International Conference on Multimedia, pp. 2292-2295, 10 2019.

[Schops] T. Schops, T. Sattler, and M. Pollefeys, "Bad slam: Bundle adjusted direct RGB-D slam," in Proceedings of the IEEE Computer Society Conference on Computer Vision and Pattern Recognition, vol. 2019—Jun. 6, 2019, pp. 134-144.

[Giubilato] R. Giubilato, M. Vayugundla, W. Stürzl, M. J. Schuster, A. Wedler, and R. Triebel, "Multi-Modal Loop Closing in Unstructured Planetary Environments with Visually Enriched Submaps," in Proceedings of the IEEE International Conference on Intelligent Robots and Systems, 5 2021.

[Arandjelovic] R. Arandjelovic, P. Gronat, A. Torii, T. Pajdla, and J. Sivic, "NetVLAD: CNN Architecture for Weakly Supervised Place Recognition," IEEE Transactions on Pattern Analysis and Machine Intelligence, vol. 40, no. 6, pp. 1437-1451, 6 2018.

[Naseer] T. Naseer, G. L. Oliveira, T. Brox, and W. Burgard, "Semantics-aware visual localization under challenging perceptual conditions," in Proceedings of the IEEE International Conference on Robotics and Automation, 7 2017, pp. 2614-2620.

[Latif] Y. Latif, R. Garg, M. Milford, and I. Reid, "Addressing challenging place recognition tasks using generative adversarial networks," in Proceedings of the IEEE International Conference on Robotics and Automation, 9 2018, pp. 2349-2355.

[Nistér 2] D. Nistér, "An efficient solution to the five-point relative pose problem," IEEE Transactions on Pattern Analysis and Machine Intelligence, vol. 26, no. 6, pp. 756-770, 6 2004.

[Baeza-Yates] R. Baeza-Yates and B. Ribeiro-neto, Modern Information Retrieval. ACM Press, 1999, vol. 463.

[Muja] M. Muja and D. G. Lowe, "Fast approximate nearest neighbors with automatic algorithm configuration," in Proceedings of the 4th International Conference on Computer Vision Theory and Applications, vol. 2, no. 2, 2009, pp. 331-340.

[Mur-Artal 3] R. Mur-Artal and J. D. Tardo's, "Fast relocalisation and loop closing in keyframe-based SLAM," in Proceedings of the IEEE International Conference on Robotics and Automation, 9 2014, pp. 846-853.

[Bay] H. Bay, A. Ess, T. Tuytelaars, and L. Van Gool, "Speeded-Up Robust Features (SURF)," Computer Vision and Image Understanding, vol. 110, no. 3, pp. 346-359, 6 2008.

[Alahi] A. Alahi, R. Ortiz, and P. Vandergheynst, "FREAK: Fast retina keypoint," in Proceedings of the IEEE Computer Society Conference on Computer Vision and Pattern Recognition, 2012, pp. 510-517.

[Leutenegger] S. Leutenegger, M. Chli, and R. Y. Siegwart, "BRISK: Binary Robust invariant scalable keypoints," in Proceedings of the IEEE International Conference on Computer Vision, 2011, pp. 2548-2555.

[Alcantarilla] P. F. Alcantarilla, J. Nuevo, and A. Bartoli, "Fast explicit diffusion for accelerated features in nonlinear scale spaces," IEEE Transactions on Pattern Analysis and Machine Intelligence, vol. 34, no. 7, pp. 1281-1298, 2013.

[Lin] Lin et al, Feature Pyramid Networks for Object Detection, CVPR 2017.

[Vaswani] Vaswani et al, Attention Is All You Need, NeurIPS, 2017.

What is claimed is:

1. A method for on-board localization of an unmanned aerial system (UAS), comprising:
(a) generating a map image of an area that the UAS is overflying, wherein:
(i) the map image is generated on-board the UAS using previously acquired images; and
(ii) the UAS is navigating in a GPS-denied environment at a distance where overflown terrain cannot be assumed to be flat;
(b) processing the map image by:
(i) orthorectifying the map image;
(ii) referencing the map image in a global reference frame by mapping pixel coordinates in the map image to the global reference frame;
(iii) generating an abstract map, wherein the generating comprises:
(A) detecting features enforcing a local minimum feature density in the map image; and
(B) the features in the abstract map are located within the global reference frame and assigned a 3D position in the global reference frame;
(c) localizing the UAS by performing on-board the UAS:
(i) acquiring camera images during flight by an on-board camera of the UAS;
(ii) selecting localization images from the camera images via a triage process;
(iii) detecting on-board image features in the localization images;
(iv) performing feature association from the detected on-board image features to the abstract map;
(v) deleting matching outliers to determine an estimate of a 3D pose of the UAS in the global reference frame;

(vi) refining the 3D pose of the UAS as an absolute pose of the UAS in the global reference frame; and (d) utilizing the localized UAS to autonomously navigate and control the UAS.

2. The method of claim 1, wherein the previously acquired images are augmented by:

available orbital image maps;

images from a previous flight of a different aerial platform; or images from a previous flight of the same aerial platform.

3. The method of claim 1, wherein the localizing further comprises:

using an on-board estimated pose of the UAS as a pose prior to predict where a feature appears in the map image using a pose error covariance plus a margin, to restrict a search range for matching in the global reference frame.

4. The method of claim 1, wherein:

the localizing:

identifies keyframe images from the previously acquired images;

stores the keyframe images in a database on-board the UAS;

utilizes a place recognition algorithm that determines an association between a current localization image from the localization images with one of the keyframe images in the database using a bag-of-words approach;

calculates the 3D pose of the UAS with respect to a previously recorded pose of the UAS when the keyframe image was taken;

improves an accuracy of the 3D pose by utilizing a loop-closure algorithm that uses the association to optimize all camera poses from the localization images and the keyframe images; and updates the map image based on the optimized camera poses.

5. The method of claim 4, wherein:

the selecting the localization images and the storing of the keyframe images are performed on-board and on-line during the flight.

6. The method of claim 1, further comprising:

feeding back results of the localizing into an on-board state estimator to directly eliminate drift and reduce error of on-board state estimates continuously in real-time to improve accuracy of UAS navigation; and utilizing an odometry frame for on-board estimated poses;

utilizing a control frame to avoid position deltas that would lead to control outputs that would make the UAS unstable.

7. The method of claim 1, further comprising:

coping with a changing resolution between a time the map image was taken and a time the localization images were acquired on-board by:

deploying a multi-resolution matching approach that incorporates feature mapping at multiple image pyramid levels in the map image and in the localization images.

8. The method of claim 1, further comprising:

coping with a changing illumination between a time the map image was taken and a time the localization images were acquired on-board by:

extending the map image with images taken of a same location at a different time of day to produce features that each have one or more descriptors extracted from the images taken of the same location, wherein the one more descriptors can be used to match the localization images within a larger range of illumination compared to the non-extended map image.

9. The method of claim 1, further comprising:

coping with a changing illumination between a time the map image was taken and a time the localization images were acquired on-board by:

using a digital elevation map (DEM) to render virtual shadows on a terrain for different times of day and use the rendered virtual shadows to alter a brightness of pixels in the map image in order to derive descriptors that are adapted to a simulated illumination regime at the different times of day.

10. The method of claim 1, further comprising:

using a machine-learning algorithm to match features agnostic to illumination and scale changes.

11. An unmanned aerial system (UAS) comprising:

(a) a UAS vehicle comprising:

(i) one or more rotors for operating the UAS vehicle aerially;

(ii) a processor;

(iii) software executed by the processor for conducting onboard autonomy of the UAS vehicle, wherein the software:

(A) generates a map image of an area that the UAS is overflying, wherein:

(1) the map image is generated on-board the UAS using previously acquired images; and (2) the UAS is navigating in a GPS-denied environment at a distance where overflown text cannot be assumed to be flat;

(B) processes the map image by:

(1) orthorectifying the map image;

(2) referencing the map image in a global reference frame by mapping pixel coordinates in the map image to the global reference frame;

(3) generating an abstract map, wherein the generating comprises:

detecting features enforcing a local minimum feature density in the map image; and the features in the abstract map are located within the global reference frame and assigned a 3D position in the global reference frame;

(C) localizes the UAS by performing on-board the UAS:

(1) acquiring camera images during flight by an on-board camera of the UAS;

(2) selecting localization images from the camera images via a triage process;

(3) detecting on-board image features in the localization images;

(4) performing feature association from the detected on-board image features to the abstract map;

(5) deleting matching outliers to determine an estimate of a 3D pose of the UAS in the global reference frame;

(6) refining the 3D pose of the UAS as an absolute pose of the UAS in the global reference frame; and (D) utilizes the localized UAS to autonomously navigate and control the UAS.

12. The UAS of claim 11, wherein the previously acquired images are augmented by:

available orbital image maps;

images from a previous flight of a different aerial platform; or images from a previous flight of the same aerial platform.

13. The UAS of claim 11, wherein the software localizes by further:

using an on-board estimated pose of the UAS as a pose prior to predict where a feature appears in the map image using a pose error covariance plus a margin, to restrict a search range for matching in the global reference frame.

14. The UAS of claim 11, wherein:

the software localizes by:

identifying keyframe images from the previously acquired images;

storing the keyframe images in a database on-board the UAS;

utilizing a place recognition algorithm that determines an association between a current localization image from the localization images with one of the key-frame images in the database using a bag-of-words approach;

calculating the 3D pose of the UAS with respect to a previously recorded pose of the UAS when the keyframe image was taken;

improving an accuracy of the 3D pose by utilizing a loop-closure algorithm that uses the association to optimize all camera poses from the localization images and the keyframe images; and updating the map image based on the optimized camera poses.

15. The UAS of claim 14, wherein:

the selecting the localization images and the storing of the keyframe images are performed on-board and on-line during the flight.

16. The UAS of claim 11, wherein the software further:

feeds back results of the localizing into an on-board state estimator to directly eliminate drift and reduce error of on-board state estimates continuously in real-time to improve accuracy of UAS navigation; and utilizes an odometry frame for on-board estimated poses;

utilizes a control frame to avoid position deltas that would lead to control outputs that would make the UAS unstable.

17. The UAS of claim 11, wherein the software further:

copes with a changing resolution between a time the map image was taken and a time the localization images were acquired on-board by:

deploying a multi-resolution matching approach that incorporates feature mapping at multiple image pyramid levels in the map image and in the local-ization images.

18. The UAS of claim 11, wherein the software further:

copes with a changing illumination between a time the map image was taken and a time the localization images were acquired on-board by:

extending the map image with images taken of a same location at a different time of day to produce features that each have one or more descriptors extracted from the images taken of the same location, wherein the one or more descriptors can be used to match the localization images within a larger range of illumi-nation compared to the non-extended map image.

19. The UAS of claim 11, wherein the software further:

copes with a changing illumination between a time the map image was taken and a time the localization images were acquired on-board by:

using a digital elevation map (DEM) to render virtual shadows on a terrain for different times of day and use the rendered virtual shadows to alter a brightness of pixels in the map image in order to derive descriptors that are adapted to a simulated illumination regime at the different times of day.

20. The UAS of claim 11, wherein the software further:

uses a machine-learning algorithm to match features agnostic to illumination and scale changes.

21. A method for on-board localization of an unmanned aerial system (UAS), comprising:

(a) generating a map image of an area that the UAS is overflying, wherein the map image is generated using previously acquired images;

(b) processing the map image by:

(i) orthorectifying the map image;

(ii) referencing the map image in a global reference frame by mapping pixel coordinates in the map image to the global reference frame;

(iii) generating an abstract map, wherein the generating comprises:

(A) detecting features enforcing a local minimum feature density in the map image; and (B) the features in the abstract map are located within the global reference frame and assigned a 3D position in the global reference frame;

(c) localizing the UAS by:

(i) acquiring camera images during flight by an on-board camera of the UAS;

(ii) selecting localization images from the camera images via a triage process;

(iii) detecting on-board image features in the localiza-tion images;

(iv) performing feature association from the detected on-board image features to the abstract map;

(v) deleting matching outliers to determine an estimate of a 3D pose of the UAS in the global reference frame;

(vi) refining the 3D pose of the UAS as an absolute pose of the UAS in the global reference frame;

(d) utilizing the localized UAS to autonomously navigate and control the UAS; and (e) coping with a changing environment between a time the map image was taken and a time the localization images were acquired on-board by:

(i) using temporal integration to identify areas of change within the map image and invalidate such areas; and (ii) processing the map image to:

(A) identify areas of feature distribution that are below a defined distribution threshold reflecting potential obstructions or false feature appearance due to introduced artificial texture; and (B) invalidate the identified areas.

22. The method of claim 21, wherein the coping with the changing environment further comprises:

the UAS adapting a motion plan to avoid areas with map feature density below a density threshold or areas with map coverage below a coverage threshold.

23. The method of claim 21, wherein the previously acquired images are augmented by:

available orbital image maps;

images from a previous flight of a different aerial plat-form; or images from a previous flight of the same aerial platform.

24. The method of claim 21, further comprising:

uses a machine-learning algorithm to match features agnostic to illumination and scale changes.

25. The method of claim 21, wherein the localizing further comprises:

using an on-board estimated pose of the UAS as a pose prior to predict where a feature appears in the map image using a pose error covariance plus a margin, to restrict a search range for matching in the global reference frame.

26. The method of claim 21, further comprising:

feeding back results of the localizing into an on-board state estimator to directly eliminate drift and reduce error of on-board state estimates continuously in real-time to improve accuracy of UAS navigation; and utilizing an odometry frame for on-board estimated poses;

utilizing a control frame to avoid positions deltas that would lead to control outputs that would make the UAS unstable.

27. The method of claim 21, further comprising:

coping with a changing resolution between a time the map image was taken and a time the localization images were acquired on-board by:

deploying a multi-resolution matching approach that incorporates feature mapping at multiple image pyramid levels in the map image and in the localization images.

28. The method of claim 21, further comprising:

coping with a changing illumination between a time the map image was taken and a time the localization images were acquired on-board by:

extending the map image with images taken of a same location at a different time of day to produce features that each have one or more descriptors extracted from the images taken of the same location, wherein the one or more descriptors can be used to match the localization images within a larger range of illumination compared to the non-extended map image.

29. The method of claim 21, further comprising:

coping with a changing illumination between a time the map image was taken and a time the localization images were acquired on-board by:

using a digital elevation map (DEM) to render virtual shadows on a terrain for different times of day and use the rendered virtual shadows to alter a brightness of pixels in the map image in order to derive descriptors that are adapted to a simulated illumination regime at the different times of day.

\* \* \* \* \*